United States Patent [19]
Bahel et al.

[11] Patent Number: 5,319,943
[45] Date of Patent: Jun. 14, 1994

[54] FROST/DEFROST CONTROL SYSTEM FOR HEAT PUMP

[75] Inventors: Vijay Bahel, Sidney; Hank Millet, Piqua; Mickey Hickey, Sidney; Hung Pham, Dayton; Gregory P. Herroon, Piqua, all of Ohio

[73] Assignee: Copeland Corporation, Sidney, Ohio

[21] Appl. No.: 8,765

[22] Filed: Jan. 25, 1993

[51] Int. Cl.$^5$ ............................................. F25D 21/06
[52] U.S. Cl. ........................................ 62/156; 62/211; 62/223
[58] Field of Search ................. 62/151, 155, 156, 234, 62/157, 158, 211, 223, 182, 204, 203, 208, 209, 210, 212, 222, 224, 225, 140

[56] References Cited

U.S. PATENT DOCUMENTS

| | | | |
|---|---|---|---|
| 3,731,498 | 5/1973 | Beatenbough et al. | 62/225 |
| 3,950,962 | 4/1976 | Odashima | 62/156 |
| 4,104,888 | 8/1978 | Reedy et al. | 62/80 |
| 4,137,725 | 2/1979 | Martin | 62/160 |
| 4,156,350 | 5/1979 | Elliott et al. | 62/80 |
| 4,171,622 | 10/1979 | Yamaguchi et al. | 62/160 |
| 4,173,871 | 11/1979 | Brooks | 62/80 |
| 4,178,767 | 12/1979 | Shaw | 62/155 |
| 4,209,994 | 7/1980 | Mueller et al. | 62/155 |
| 4,211,089 | 7/1980 | Mueller et al. | 62/209 |
| 4,215,554 | 8/1980 | Pohl | 62/156 |
| 4,251,988 | 2/1981 | Allard et al. | 62/80 |
| 4,328,680 | 5/1982 | Stamp, Jr. et al. | 62/155 |
| 4,338,790 | 7/1982 | Saunders et al. | 62/80 |
| 4,365,983 | 12/1982 | Abraham et al. | 62/81 |
| 4,395,887 | 8/1983 | Sweetman | 62/155 |
| 4,406,133 | 9/1983 | Saunders et al. | 62/80 |
| 4,407,138 | 10/1983 | Mueller | 62/126 |
| 4,474,024 | 10/1984 | Eplett et al. | 62/140 |
| 4,499,739 | 2/1985 | Matsuoka et al. | 62/212 |
| 4,538,420 | 9/1985 | Nelson | 62/140 |
| 4,549,403 | 10/1985 | Lord et al. | 62/201 |
| 4,563,877 | 1/1986 | Harnish | 62/80 |
| 4,627,245 | 12/1986 | Levine | 62/157 |
| 4,627,484 | 12/1986 | Harshbarger et al. | 62/155 X |
| 4,662,184 | 5/1987 | Pohl et al. | 62/156 |
| 4,680,940 | 7/1987 | Vaughn | 62/155 |
| 4,698,981 | 10/1987 | Kaneko et al. | 62/180 |
| 4,745,766 | 5/1988 | Bahr | 62/176.6 |
| 4,750,332 | 6/1988 | Jenski et al. | 62/80 |
| 4,751,825 | 6/1988 | Voorhis et al. | 62/234 |
| 4,850,204 | 7/1989 | Bos et al. | 62/234 |
| 4,882,908 | 11/1989 | White | 62/155 |
| 4,903,500 | 2/1990 | Hanson | 62/156 |
| 4,916,912 | 4/1990 | Levine et al. | 62/80 |

*Primary Examiner*—Harry B. Tanner
*Attorney, Agent, or Firm*—Harness, Dickey & Pierce

[57] ABSTRACT

A microprocessor based control system for controlling frost accumulation on the outdoor evaporator coil of a heat pumping system during normal heat mode operations. A demand defrost concept is implemented to increase efficiency and maximize time intervals between defrost cycles by initiating the defrost cycle only when an optimal maximum amount of frost has accumulated on the coil. The control system also facilitates monitoring of the rate of frost accumulation to make the outdoor coil conditions less favorable to frost buildup.

36 Claims, 14 Drawing Sheets

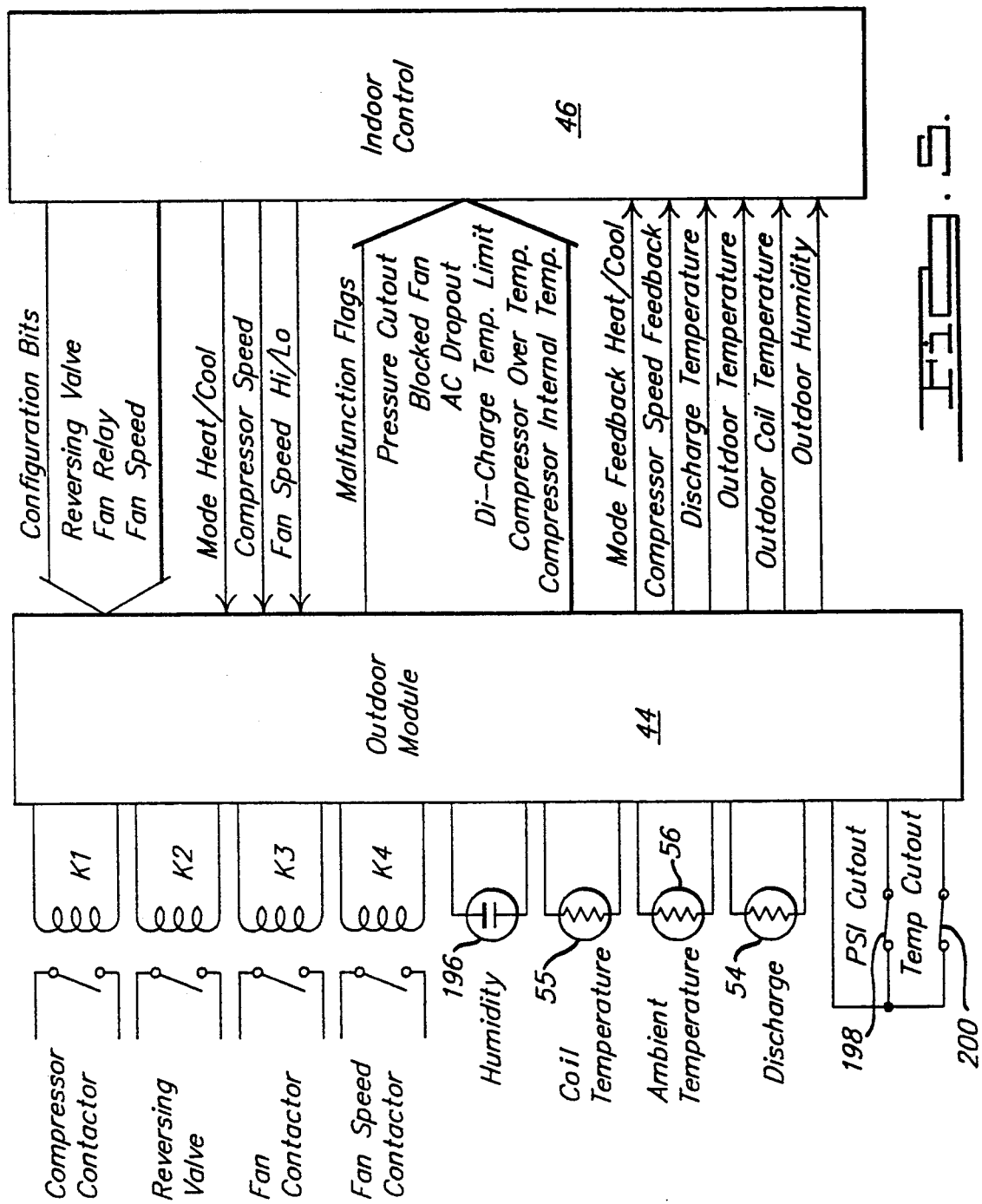

FROST/DEFROST CONTROL SYSTEM FOR HEAT PUMP

BACKGROUND AND SUMMARY OF THE INVENTION

The present invention relates generally to electronic control systems for air conditioners, heat pumps and refrigeration equipment. More particularly, the invention relates to an apparatus and method utilizing digital circuitry to control a heat pump during its normal operating cycle in order to control the accumulation of frost on the outdoor evaporator coil while providing optimum system efficiency and performance during the defrost cycle.

Whether operating as an air-conditioning system or a heat pump system, the basic refrigeration cycle operates by metering refrigerant through a closed system in a precisely controlled manner. The refrigerant cools by evaporation in a heat exchanger commonly called an evaporator coil. The refrigerant is metered to the evaporator coil through an orifice sometimes called an expansion valve. Ideally, a refrigeration system should meter just enough refrigerant into the evaporator coil so that the refrigerant extracts heat throughout the length of the coil as it evaporates. Due to changing dynamics of the system, changes in thermostat settings and changes in load from sun, wind and so forth, the optimal flow through the expansion valve will need to be varied as the system operates.

The precise control of the expansion valve during steady state operation, to achieve optimal efficiency during steady state operation, has been the subject of much study in the continued effort to improve energy efficiency. In addition to the desire to improve efficiency, there is also a need to address the frost buildup problem. In the heating mode operation of a heat pump system, a layer of frost normally builds on the outdoor coil surfaces whenever the temperature of the coil falls below 32° F. This frost significantly reduces the heating capacity of the heat pump and, as the frost continues to accumulate, the performance of the unit eventually degrades to a point where the frost has to be melted.

This defrost process, however, is extremely inefficient. The heating process is interrupted and, in effect, replaced with a counterproductive air conditioning process. This wastes energy and reduces the heating capacity of the heat pump. Heat flows in the wrong direction during defrosting intervals, thus cooling the house or building. To offset this cooling it can be necessary to turn on the resistance heaters, thereby consuming additional energy.

The need to defrost the evaporator coil would appear to be a necessary evil in all but the most arid environments. It would therefore be desirable if a heat pump system could be developed to reduce the number of defrost cycles per day and also to effect the defrosting cycle more quickly and efficiently when it is needed.

The present invention addresses this need through the use of a microprocessor-based control system and digitally controllable expansion valve. The present system utilizes a "demand defrost" scheme wherein the intervals between defrost cycles vary rather than being simply performed on a periodic basis. The defrost cycle is initiated only when a predetermined amount of frost has accumulated on the evaporator coil. This saves energy and improves efficiency by eliminating unnecessary defrost cycles.

In addition, time intervals between defrost cycles are further maximized by making the outdoor coil conditions less favorable to a frost buildup. This is accomplished by monitoring the rate of accumulation of frost buildup in terms of the temperature difference between the ambient air and outdoor coil. If a change in the slope of this temperature difference is sensed, refrigerant flow through the system is increased by modulating the expansion valve setting, thereby raising the outdoor coil temperature. The microprocessor-based system determines the proper valve setting, balancing the objective of maintaining an efficient temperature coil with the objective of gradually raising the temperature of the coil (with some efficiency tradeoff) to retard frost accumulation. The system is therefore able to maintain a level of efficient operation for longer periods.

The present control system also modulates the expansion valve setting to open the valve orifice to a greater diameter than normal on the initiation of the defrost cycle. This enables rapid transfer of the refrigerant charge to the outdoor coil and significantly reduces the length of the defrost cycle. In addition, by pre-starting the outdoor fan prior to termination of the defrost cycle, pressure transients are reduced resulting in greater reliability and longevity of the heat pump and its components.

The result is a state-of-the-art heat pump system which offers high efficiency and longer component life. Because frost buildup on the outdoor coil is monitored and precisely controlled, intervals between defrost can be maximized. Losses incurred by the defrost cycle ar minimized and system efficiency can be optimized.

For a more complete understanding of this invention, its objects and advantages, reference may be had to the following specification and appended claims, taken in conjunction with the accompanying drawings.

BRIEF DESCRIPTION OF THE DRAWINGS

FIGS. 8A and 8B (also herein referred collectively to as FIG. 8) is a flowchart illustrating the implementation of the improved defrost cycle of the present invention;

FIG. 14A depicting a comparatively longer defrost and FIG. 14B depicting a comparatively shorter defrost; and FIG. 15 is a graph showing the optimum defrost initiation temperature for different outdoor ambient temperatures.

DESCRIPTION OF THE PREFERRED EMBODIMENT

The present invention provides an apparatus and method for optimizing the refrigeration cycle employed in air conditioners, heat pumps and refrigeration equipment. The system employs a microprocessor based control system and a unique complement of sensors and an electronically controlled expansion valve. To illustrate the principles of the invention, a heat pump system capable of providing both heating and cooling will be described. A heat pump system of the type described might be suitable for heating and cooling a commercial or residential building, although the principles of the invention are not limited to commercial and residential heating and cooling and are applicable to all pumped heat transfer systems.

Figure 1:
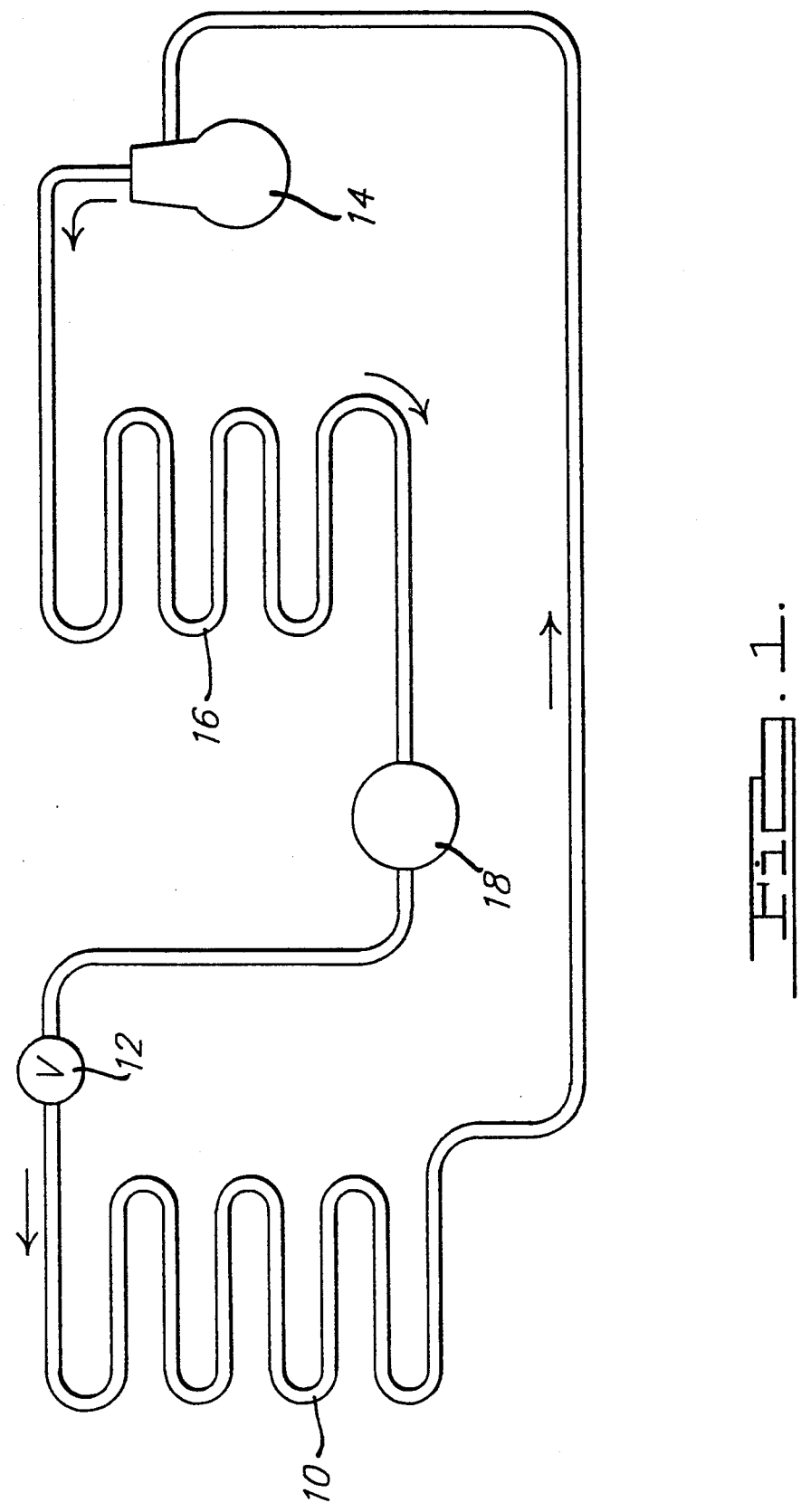
FIG. 1 is a schematic representation of the basic refrigeration cycle.

However, before giving a detailed description of the presently preferred embodiment, a brief review of the refrigeration cycle will be given. That cycle will be described in connection with a basic heat pump system illustrated schematically in FIG. 1.

The heat pump cycle uses the cooling effect of evaporation to lower the temperature of the surroundings near one heat exchanger (the evaporator) and it uses the heating effect of high pressure, high temperature gas to raise the temperature of the surroundings hear another heat exchanger (the condenser). This is accomplished by releasing a refrigerant under pressure (usually in the liquid phase) into a low pressure region to cause the refrigerant to expand into a low temperature mixture of gas and liquid. Commonly, this low pressure region comprises an evaporator coil, such as evaporator coil 10. The refrigerant mixture once in the evaporator coil 10 is exposed to the high temperature ambient air of the region desired to be cooled. Evaporation of refrigerant from liquid to gas absorbs heat from the ambient air and thereby cools it.

Release of refrigerant into the low pressure evaporator coil is usually metered by a restricted orifice or valve commonly called an expansion valve 12. There are a wide variety of different types of expansion devices in use today, ranging from simple nonadjustable capillary tubes to electrically adjustable valves such as pulse width modulated valves. The refrigerant at the outlet of the evaporator coil is compressed back into a high pressure state by compressor 14 and condensed into a liquid phase by condenser 16 to be used once again. In a heat pump application, the condensing of high pressure gas into a liquid phase supplies heat to the surroundings.

Having reviewed the basic principles of the heat pump cycle, a presently preferred embodiment of the invention will be given. Although the invention can take many forms, it will be described in conjunction with FIG. 2 wherein a heat pump system is depicted generally at 20. The system includes an indoor unit 22, a room unit or thermostat unit 23 and an outdoor unit 24. The indoor unit includes an indoor coil or heat exchanger 26 and an indoor fan 28. The indoor fan is preferably driven by a variable speed motor 30. The indoor fan and coil are situated using suitable duct work so that the fan forces ambient indoor air across the indoor coil at a rate determined by the speed of the variable speed motor.

The outdoor unit includes an outdoor coil or heat exchanger 32 and an outdoor fan 34 driven by suitable motor 36. In the heating mode of the heat pump this outdoor coil functions as the evaporator and it is on outdoor coil 32 that frost typically builds when the temperature thereof falls below 32° F. Preferably the outdoor unit comprises a protective housing which encases the outdoor coil and outdoor fan so that the fan will draw ambient outdoor air across the outdoor coil to improve heat transfer. The outdoor unit also typically houses a compressor 38.

Figure 2:
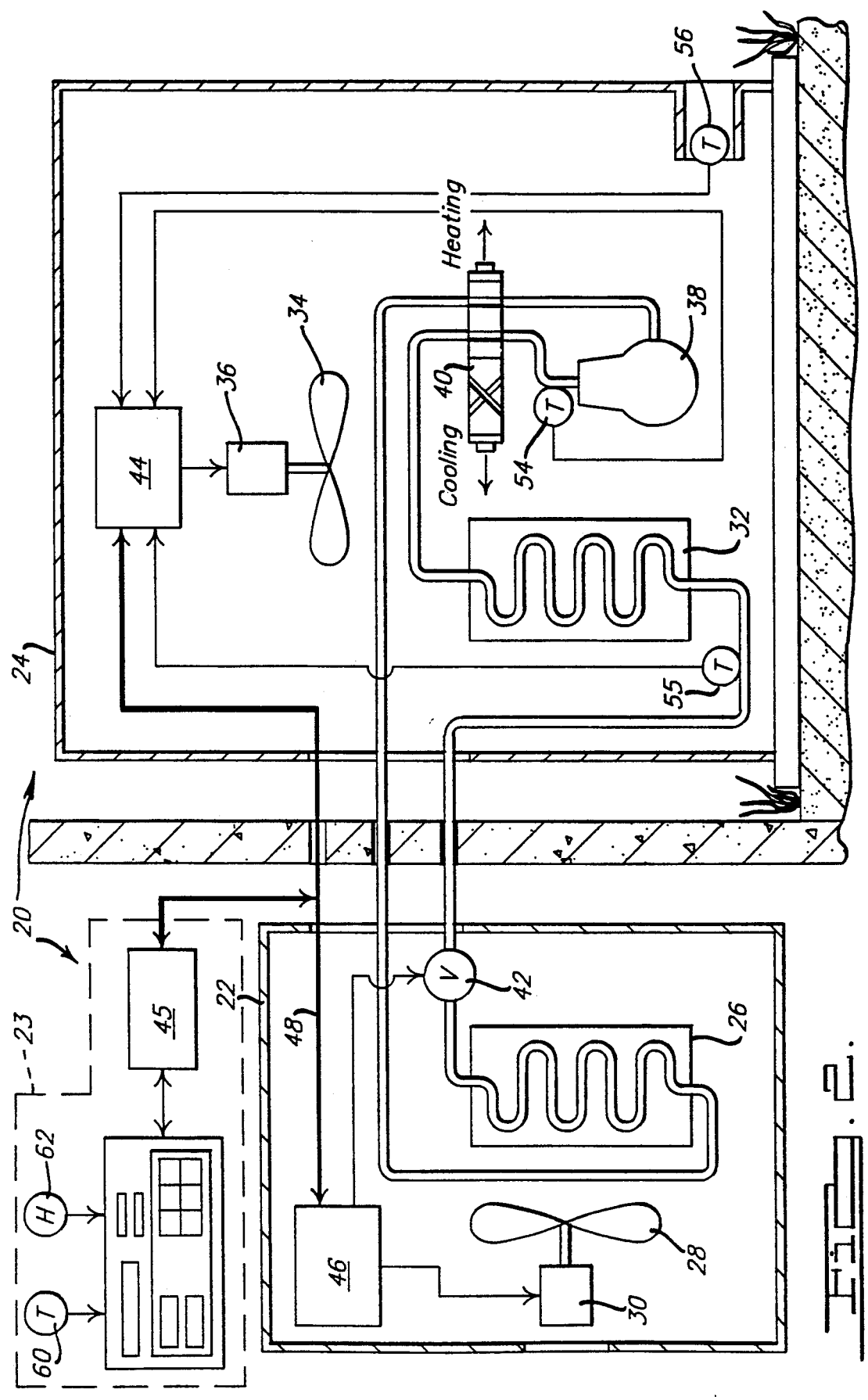
FIG. 2 is a schematic diagram of a preferred embodiment of the refrigeration control system of the invention, illustrated in a heat pump application.

The system illustrated in FIG. 2 is a so-called "heat pump" system because it can be used for both cooling and heating, by simply reversing the function of the indoor coil and the outdoor coil. This is done with a four-way reversing valve 40. Referring to FIG. 2, when the four-way valve is switched to the COOLING position (shown), the indoor coil functions as the evaporator and the outdoor coil functions as the condenser. When four-way valve is set to the HEATING position (the alternate position), the functions of the coils are reversed. The indoor coil functions as the condenser coil and the outdoor coil functions as the evaporator coil.

In addition to the indoor and outdoor coils and the compressor, the present system also uses an electronically controllable expansion valve (EXV) 42. In the presently preferred embodiment the expansion valve is a continuously variable (or incrementally variable) stepper motor valve which can be adjusted electronically to a wide range of orifice sizes or valve openings, ranging from fully open to fully closed. Although it is possible to implement the control system of the invention with other types of electrically controlled valves, pulse width modulated valves being an example, the present embodiment prefers the stepper motor valve because it provides ripple-free operation and because it is more trouble-free. The stepper motor valve only needs to move or cycle when an orifice size adjustment is made. This may happen several times during a typical operating sequence (e.g., several times per hour). In contrast, the pulse width modulated valve cycles continuously during the entire operating sequence.

The presently preferred system for controlling frost accumulation on the outdoor evaporator coil is a microprocessor-based system which gathers data from various sensors and which, among other things, determines the proper setting of the expansion valve based on the data gathered. More specifically, the presently preferred embodiment utilizes three interconnected microprocessor-based control units 44, 45 and 46. Control unit 44 is associated with the outdoor unit 24 and control unit 46 is associated with the indoor unit 22. In addition, the room unit or thermostat unit 23 may also include a microprocessor-based control unit 45. Preferably, all three microprocessor-based control units are linked together via a suitable communication link 48 such as a parallel or serial communication link. The outdoor control unit 44 is in part responsible for data collection while the indoor control unit 46 is responsible for: on/off cycling of system, modulating the indoor fan speed, control of expansion valve, start/termination of demand defrost, malfunction detection and performing system diagnostic functions.

Figure 3:
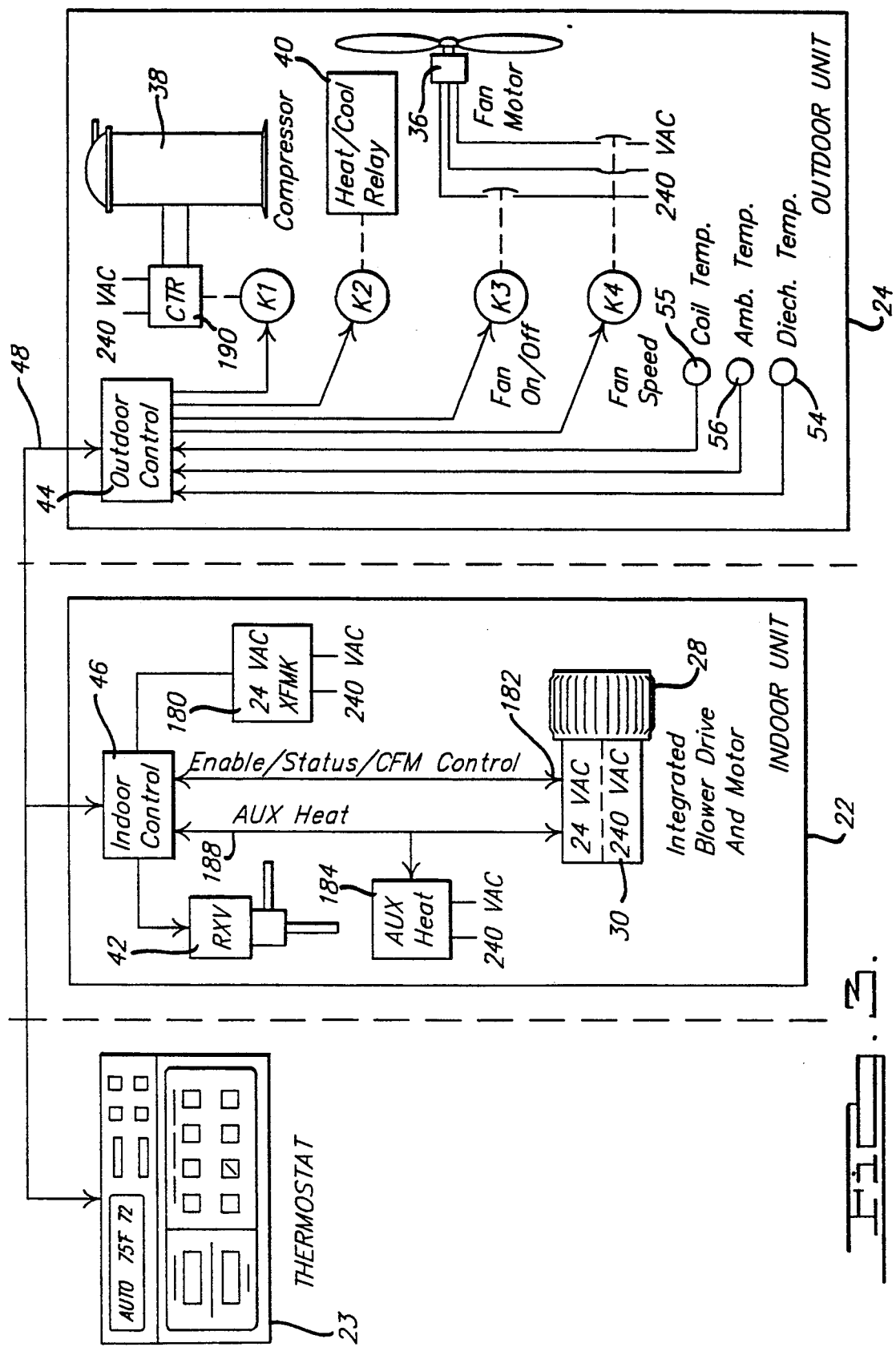
FIG. 3 is a schematic diagram of the control system of the present invention.

For convenience, the microprocessor-based control system used in implementing the refrigeration system of FIG. 2 is shown substantially in FIG. 3. Specifically, the indoor unit 22, room unit or thermostat unit 23 and outdoor unit 24 are interconnected by communication link 48. Preferably communication link 48 is a four wire bus supplying AC power and ground to all three units and also providing a pair of serial communication data lines. The indoor unit 22, room unit 23 and outdoor unit 24 each have a microprocessor-based control unit which communicates with the other units over the communication link. In FIG. 3 the microprocessor-based control units 44 and 46 have thus been illustrated. The room unit 23 also includes a microprocessor-based control unit. The details have been omitted from FIG. 3 to simplify the illustration.

Also associated with the indoor unit 22 is the indoor fan or blower 28, which includes an integrated drive and variable speed motor 30. The presently preferred embodiment uses a motor which requires 240 VAC. Control signals and logic signals sent via communication link 48 are at 24 VAC and 5 VDC. A step-down transformer 180 is provided on the indoor unit for this purpose. Motor 30 receives its operating control instructions from and supplies status signals to the indoor control unit 46 at 24 VAC line levels over motor communication path 182.

The presently preferred embodiment uses electric resistance heaters to supply auxiliary heat. Indoor control unit 46 is responsible for determining when to turn the auxiliary heat on and off. This signal is supplied at 24 VAC logic levels. The indoor control unit 46 also supplies 24 VDC logic signals to control the expansion valve 42.

The outdoor unit also supplies and receives a number of different control signals at 24 VAC logic levels via the paths illustrated. For example, outdoor control unit 44 supplies the ON/OFF signal to compressor relay K1. This relay in turn energizes the compressor contactor 190. The outdoor control unit 44 similarly supplies ON/OFF control signals to the heat/cool relay K2, which switches the reversing valve 40 as described above to place the system in either the HEATING or COOLING mode. The outdoor control unit supplies logic signals to the fan ON/OFF relay K3 and the fan speed relay K4. These relays in turn control the outdoor fan motor 36. In the presently preferred embodiment the outdoor fan motor 36 is a two speed motor. Outdoor control unit 44 also receives logic level data from the outdoor sensors, such as first temperature sensor 55, which measures the temperature of the outdoor coil, second temperature sensor 56, which measures the ambient or environment air temperature and discharge temperature sensor 54, which measures the discharge temperature of compressor.

Figure 4:
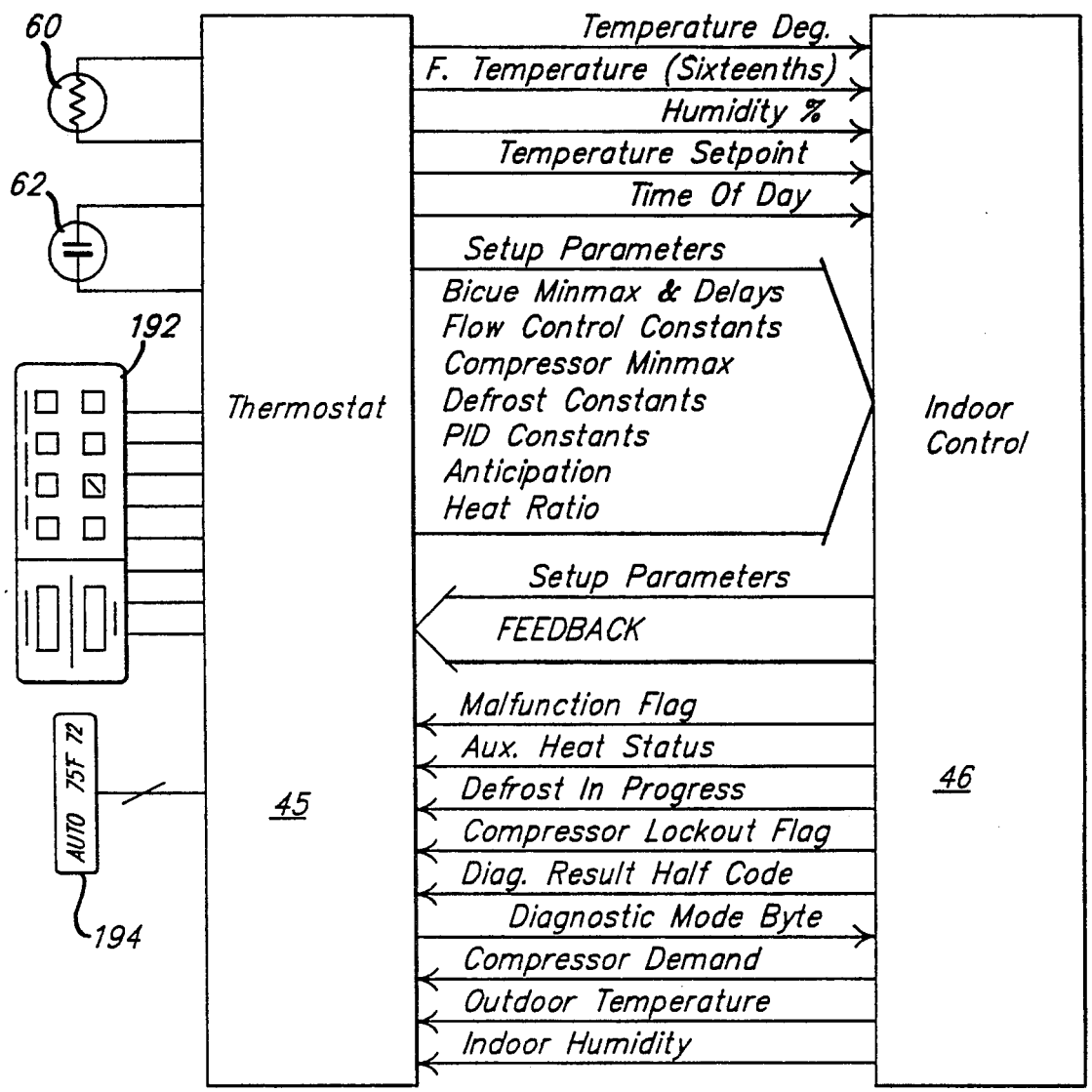
FIGS. 4 and 5 are detailed schematics illustrating the communication between the various microprocessors.
Figure 5A:
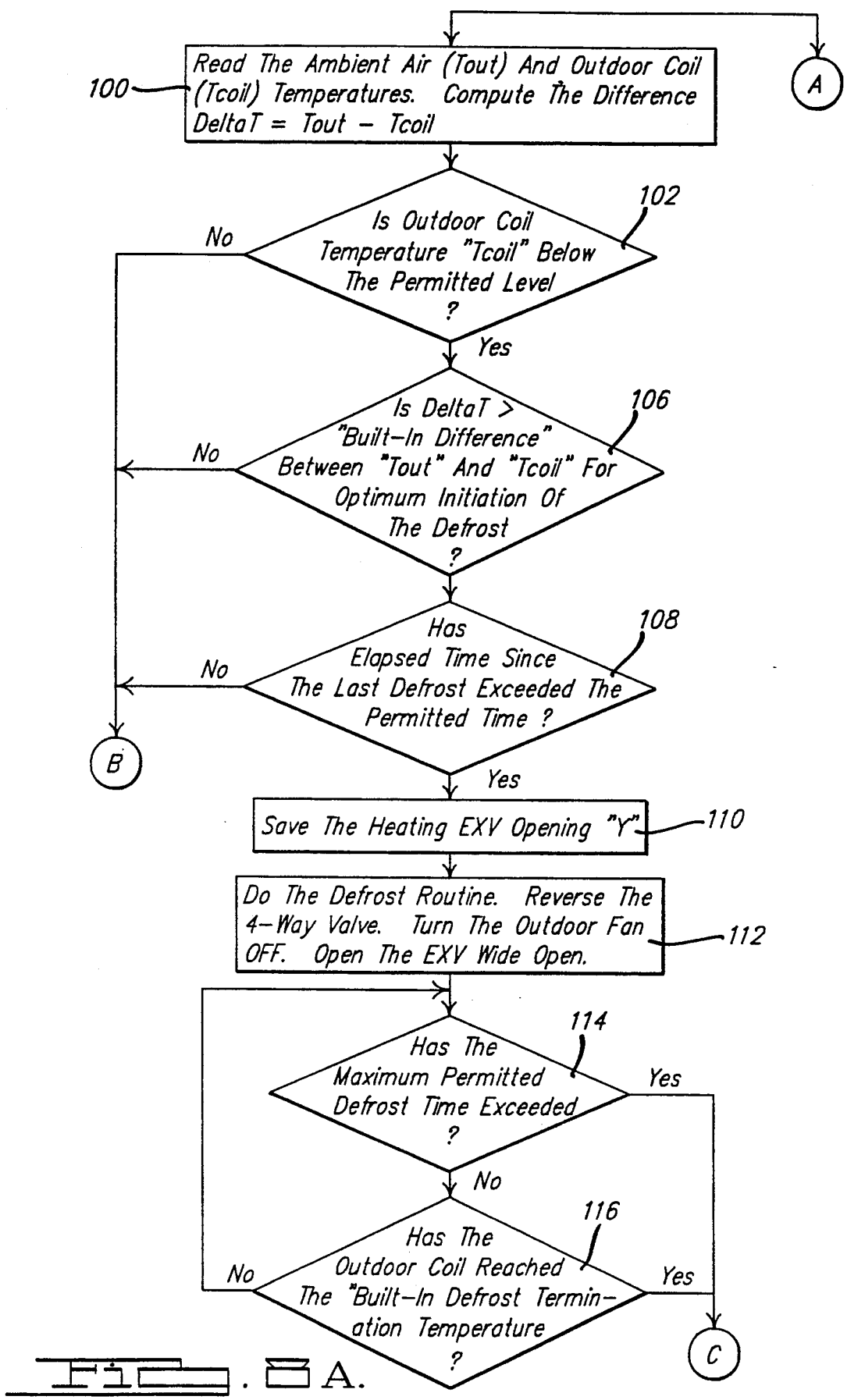

Referring to FIGS. 4 and 5, the microprocessor-based control units 44, 45 and 46 are shown in somewhat greater detail to show the types of signals which are communicated between the units during operation. In FIG. 4 the room unit control unit 45 is shown together with its associated keypad 192 and display 194. The keypad is coupled to the room unit control unit 45 via an eight line parallel data bus. The display is similarly coupled via a 36 line parallel data bus. Note the indoor temperature sensor 60 and indoor humidity sensor 62 are also coupled to the room unit control unit 45. Note, also that a humidity sensor 196 may also be employed in the outdoor unit (see FIG. 5) so that outdoor humidity can be measured. To protect the outdoor unit, a pressure cutout 198 and a temperature cutout 200 are provided.

Figure 13:
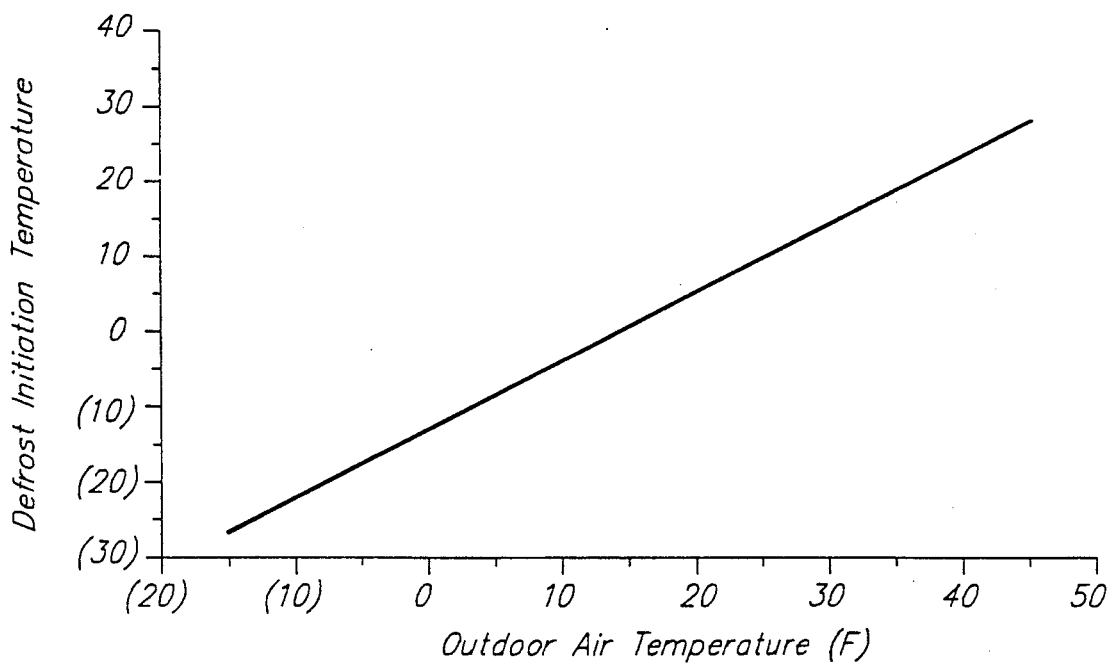
FIG. 13 is a software block diagram illustrating the preferred microprocessor-based control system.
Figure 13:
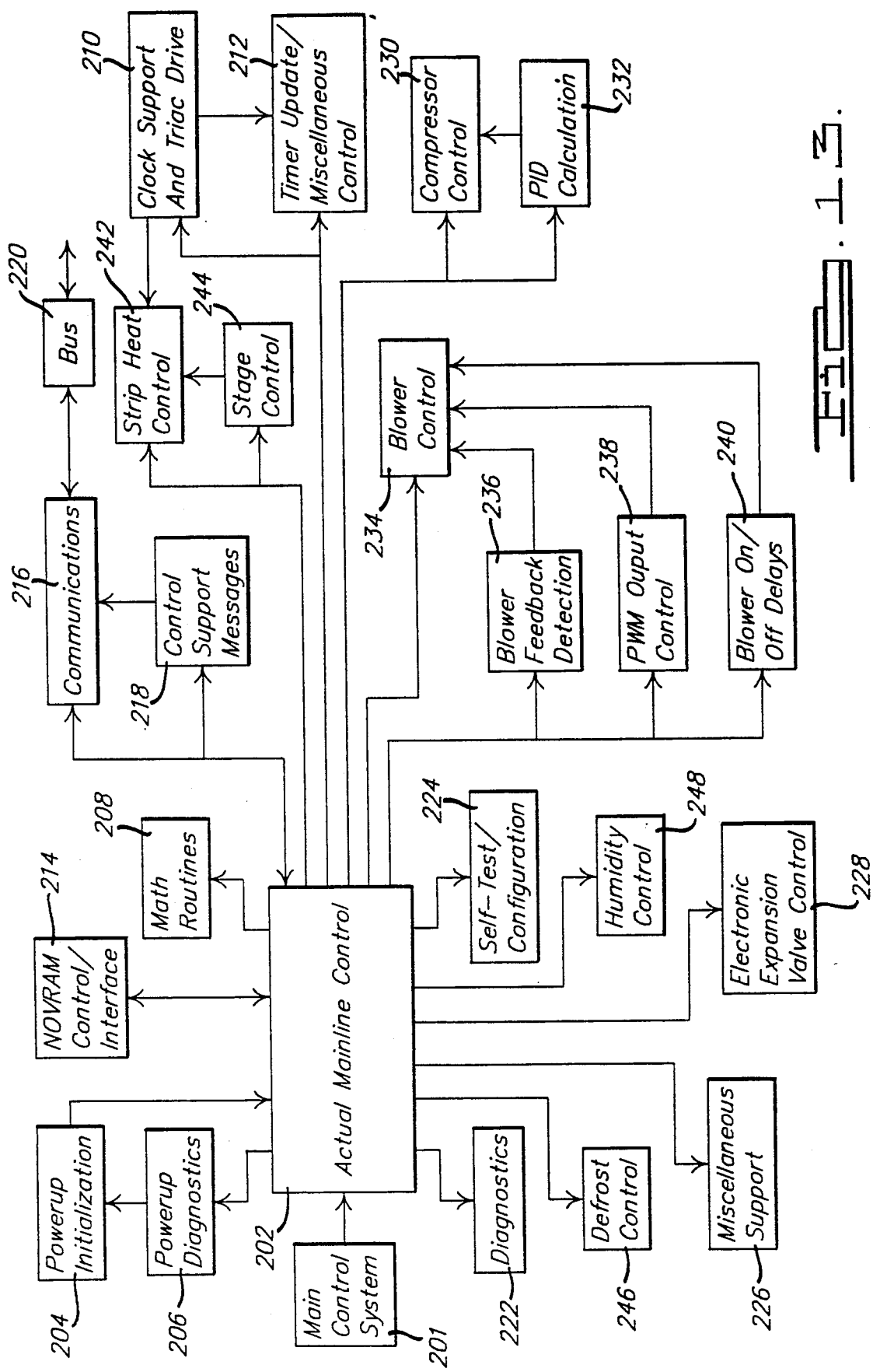

The indoor control unit 46 functions as the master, controlling the overall system performance and much of the communication among the three control units. FIG. 13 is a software block diagram illustrating the functional software elements which comprise the present control system. Because the indoor control unit functions as the master in the presently preferred embodiment, many of the software modules of FIG. 13 reside in and are performed by the indoor control unit 46. Of course, from a system standpoint, any one of the microprocessor-based modules could serve as the master. In addition, the software functions depicted in FIG. 13 could be distributed across or shared by all three control units. Thus the specific allocation of certain functions to certain ones of the control units adopted by the present embodiment should not be viewed as a limitation upon the scope of the claims.

Referring to FIG. 13, at the heart of the software control system is the mainline control block 202. This block or module interfaces, either directly or indirectly, with each of the remaining blocks or modules. The mainline block 202 is supervised by the main control system block 201, which supplies the global system performance requirements. The mainline control block is responsible for effectuating the instructions of the main control system by interfacing with the other modules. For example, the power up initialization and power up diagnostics blocks are called by the mainline control block during initial power up. The mainline control block has access to a math routines block 208 which is called upon anytime math calculations take place. Similarly, mainline control block 202 has access to the clock support and triac drive block 210 and the timer update/miscellaneous control block 212, which are used anywhere timing of events is involved.

The system is adaptive, in that it is capable of continuously updating parameters during normal operation. At initial power up, however, the system uses preset starting parameters which are stored in a nonvolatile RAM or NOVRAM memory that is accessed via the NOVRAM control/interface block 214. The nonvolatile RAM may also store other numerical values such as constants which are not ordinarily altered during system operation. The use of nonvolatile RAM for this purpose is quite advantageous, since it allows a standardized hardware system to be custom programmed in the factory before shipment. This allows a more or less standard control module package to be used for a wide range of different heating and cooling systems by simple in factory programming. This results in a considerable cost savings.

Communications and message handling is provided by the communications block 216 and the control support messages block 218. These blocks implement the communication protocol described in Tables I–III. The actual details regarding the manner in which messages are placed on the communication link are handled by the bus block 220. System diagnostics are performed by block 222. If desired, the system may be programmed to perform self-tests and self-configuration. This is performed by block 224. In addition, any miscellaneous support functions which do not fit the other described categories may be called by the mainline control block. For illustration purposes, the miscellaneous support block 226 is thus shown.

Mainline control block 202 is further responsible for the important functions of controlling the refrigeration system components, the indoor fan and any auxiliary heating equipment. With respect to the refrigeration system components, an electronic expansion valve control block 228 is provided. This block is responsible for determining and effecting the setting of the expansion valve. Similarly, the compressor control block 230 is provided for turning the compressor on and off via relay K1. A PID algorithm or other suitable control algorithm implemented in block 232 provides the adaptive control by which the system updates its parameters during operation.

Regarding the fan speed control, the blower control block 234 receives instructions from blower feedback detection block 236, pulse width modulation output control block 238 and blower ON/OFF delay block 240. The presently preferred indoor fan motor is driven by a pulse width modulation system by which the pulse width of the motor drive signal is varied to modulate the speed. The pulse width modulation output control bloc 238 and blower feedback detection block 236 provide the pulse width modulated closed-loop system function. The blower ON/OFF delay block 240 alters the ON/OFF sequence of the indoor fan to optimize airflow in relation to the temperature of the heat exchanging elements.

In systems which use auxiliary heat, such as resistance heating elements, the strip heat control block 242 and stage control block 244 are provided. The strip heat control block is responsible essentially for activating one or more relays to turn on the auxiliary heating elements. The stage control block causes the strip heat control block to do so in stages based on the desired temperature and how much heat is required.

Figure 8B:
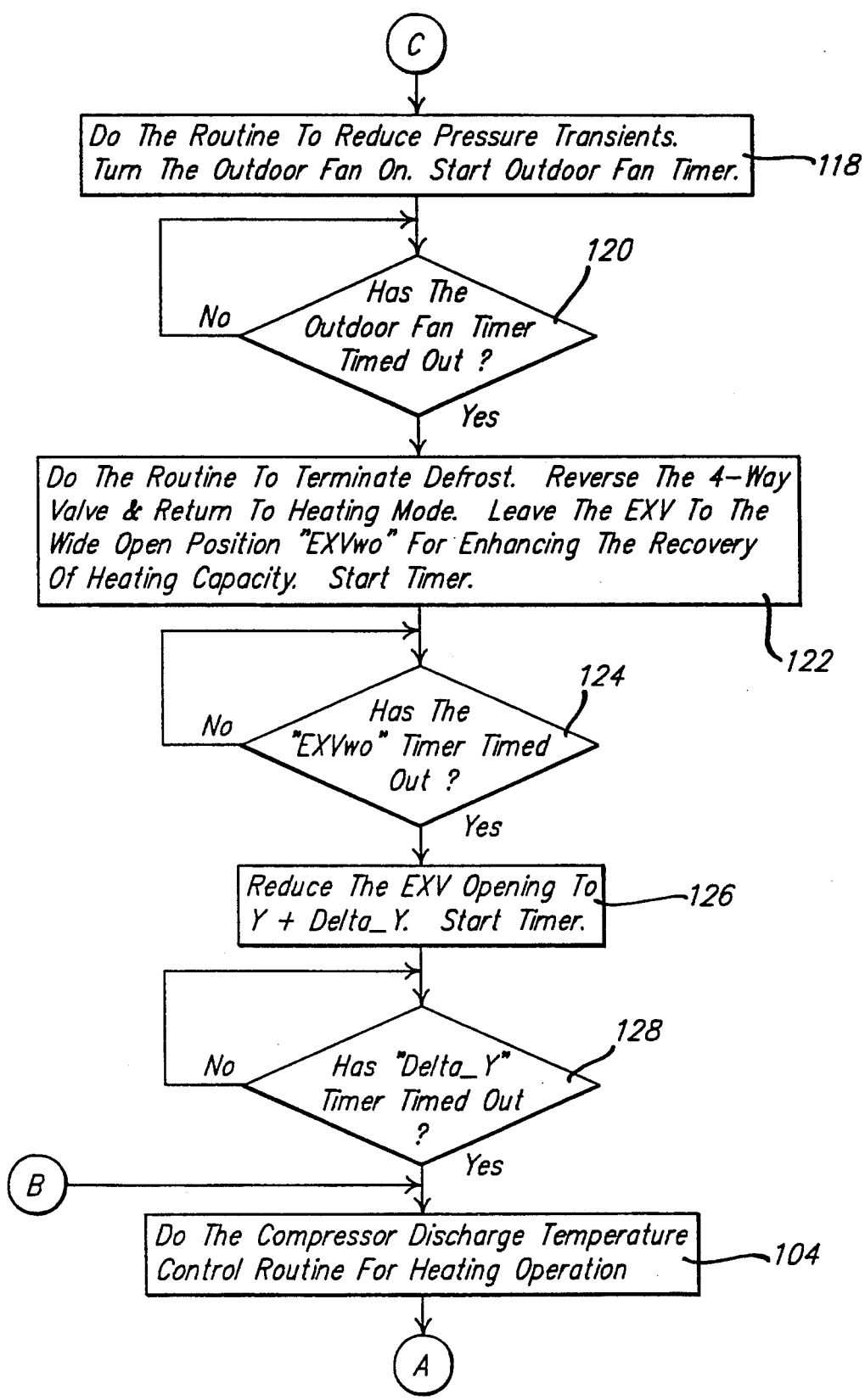

The presently preferred embodiment uses a demand defrost cycle to periodically melt accumulated frost on the coil. This is handled by the defrost control block 246. This block 246 is described in more detail in the flowcharts on FIGS. 8 and 11. Interface between the defrost control block 246 and the outdoor unit 24 takes place through the mainline control block 202, the communications block 216 and the bus block 220. In addition, fan speed may be regulated to control humidity or to maintain system operation within the ASHRAE comfort zone. This is handled by the humidity control block 248.

In reviewing FIGS. 4 and 5 it should be kept in mind that the presently preferred interunit communication is done via the serial communication link 48. It is the nature of serial communication that the communication line is shared by all units and thus only one message is communicated at a time. Thus in these figures, the itemized data flow between room unit control unit 45 and indoor control unit 46 and between outdoor control unit 44 and indoor control unit 46 are shown to illustrate the type of information which is passed back and forth during system operation. Although this transfer of data is illustrated as a parallel operation, and it could be implemented in a parallel communication link, the present embodiment prefers a serial link.

To transfer this much information back and forth during system operation the microprocessor-based systems send and acknowledge messages in a serial fashion according to a predefined protocol. Each of the three units has sufficient random access memory, and in some cases nonvolatile memory, in which to store the various parameters which comprise the information communicated between them. Thus, for example, the outdoor temperature measured by sensor 56 is stored in the random access memory of outdoor control unit 44, to be thereafter communicated to indoor control unit 46 where it is stored in the random access memory of control unit 46. Thereafter, the same outdoor temperature data may be communicated to the room unit where it is stored in the room unit control unit's random access memory.

The building occupant could then, if desired, enter the appropriate keypad function to request a display of the outdoor temperature. This is but one example of how data flows from module to module. By using interim storage in each of the modules, each module is able to handle its own system critical tasks with high priority, attending to the noncritical tasks only when there is time. Thus the building occupant requesting a display of outdoor temperature would not cause the outdoor module to neglect its task of controlling the compressor and likewise would not cause the indoor unit to neglect its task of regulating the fan speed. The building occupant requesting and outdoor temperature display would see a temperature value displayed instantly, although the value displayed would be the value obtained during the most recent data refresh sequence.

Figure 6:
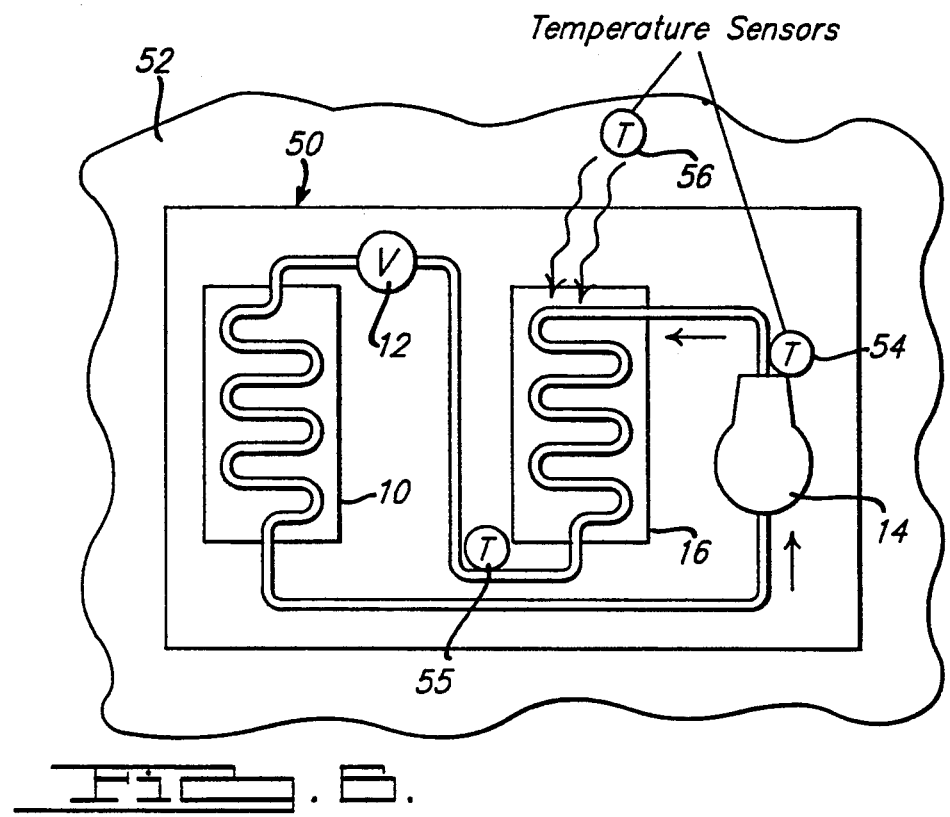
FIG. 6 is a schematic representation illustrating the sensor arrangement utilized by the invention.
Figure 7:
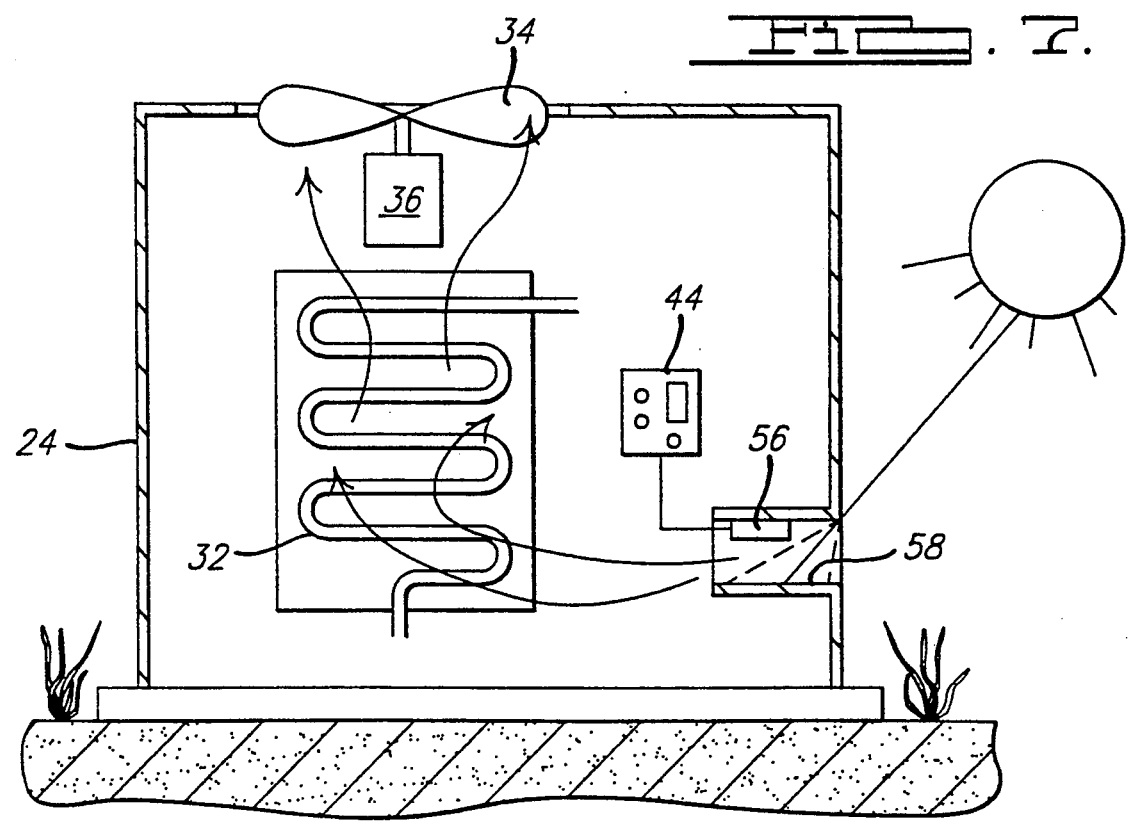
FIG. 7 is a cross-sectional view showing a preferred manner of positioning the ambient outdoor temperature sensor of the invention to reduce the effects of radiant heating.

As diagrammatically illustrated in FIGS. 6 and 7, temperature sensor 55 is positioned within the refrigeration system 50, but temperature sensor 56 is positioned in the outside environment 52. In addition temperature sensor 54 measures the compressor discharge temperature used to control the expansion valve setting for steady state operation. Temperature sensor 55 is preferably positioned adjacent to the outdoor coil 16 and accurately measures the temperature of the coil surface. Temperature sensor 56 is preferably positioned in an airflow path which will measure the temperature of the ambient air surrounding or forced across the outdoor coil 16 Placement of this ambient air temperature sensor can be important. In the HEATING mode, with the evaporator coil located outdoors, the ambient temperature sensor should be positioned so that it will not receive direct sunlight. This may be accomplished by placing the ambient temperature sensor in a tube or enclosure which is open to airflow but shielded from the direct rays of the sun.

FIG. 7 illustrates one manner of shielding the ambient outdoor air temperature sensor 56. As illustrated, sensor 56 is positioned within a tube 58 which is mounted in the housing sidewall of the outdoor unit 24. The tube shields sensor 56 from the direct rays of the sun, as shown, but is open to the atmosphere and to the interior of the housing so that ambient air will flow across sensor 56 under force of outdoor fan 34. The moving airflow produced by fan 34 virtually negates any radiant and conductive heating effects caused by heating of the housing by the sun's radiant energy. The result is an accurate measurement of the ambient air temperature which will be drawn by fan 34 across outdoor coil 32.

Frost buildup can be monitored and controlled using the control system of the present invention along with the temperature data provided by sensors 55 and 56. Microprocessors 44, 45 and 46 preferably cooperate to receive data input by those sensors as well as thermostat 23 and other system components. These microprocessors also preferably cooperate as set forth above to provide control signals to the various other heat pump components including EXV 42, fans 28 and 34, four-way reversing valve 40 and so forth.

The temperature measurements obtained from sensors 55 and 56, along with microprocessors 44, 45 and 46 according to the teachings of the present invention facilitate implementation of a demand defrost scheme which optimizes the time interval between the defrosting operations. The defrost cycle is initiated according to need, only when an optimal maximum amount of accumulation of frost has been built up on the evaporator coil. The sequence of steps performed by the control system of the present invention to provide this type of defrost system is shown in detail in the flowchart of FIG. 8.

As shown in the figure, in step 100 the difference between the outdoor air ambient temperature and the temperature of the outdoor coil, represented as $\Delta t$, as measured by sensors 56 and 55, respectively, is calculated. The outdoor coil temperature is then compared to a predetermined permitted level above which the defrost cycle will not be initiated, preferably about 32° F., in step 102. Temperature difference $\Delta t$ is then compared to a built-in difference indicative of an optimal maximum amount of frost necessary to initiate the defrost cycle. The built in difference is preferably calculated based on a linear function of outdoor ambient air temperature. The linear function has a slope and y intercept ($y = mx + b$) to call for defrost when there is a 20% loss in capacity compared to a clear (unfrosted) outdoor coil capacity.

FIG. 15 shows the relationship between the optimum defrost initiation temperature as a function of the outdoor air temperature.

If the coil temperature is not below the permitted level, or the temperature difference is not great enough, or not enough time has expired since the last defrost cycle (about 40 minutes, step 108), step 104 is performed wherein the compressor discharge temperature control routine for heating operations is begun and the temperature monitoring process begins again at step 100.

Figure 14A:
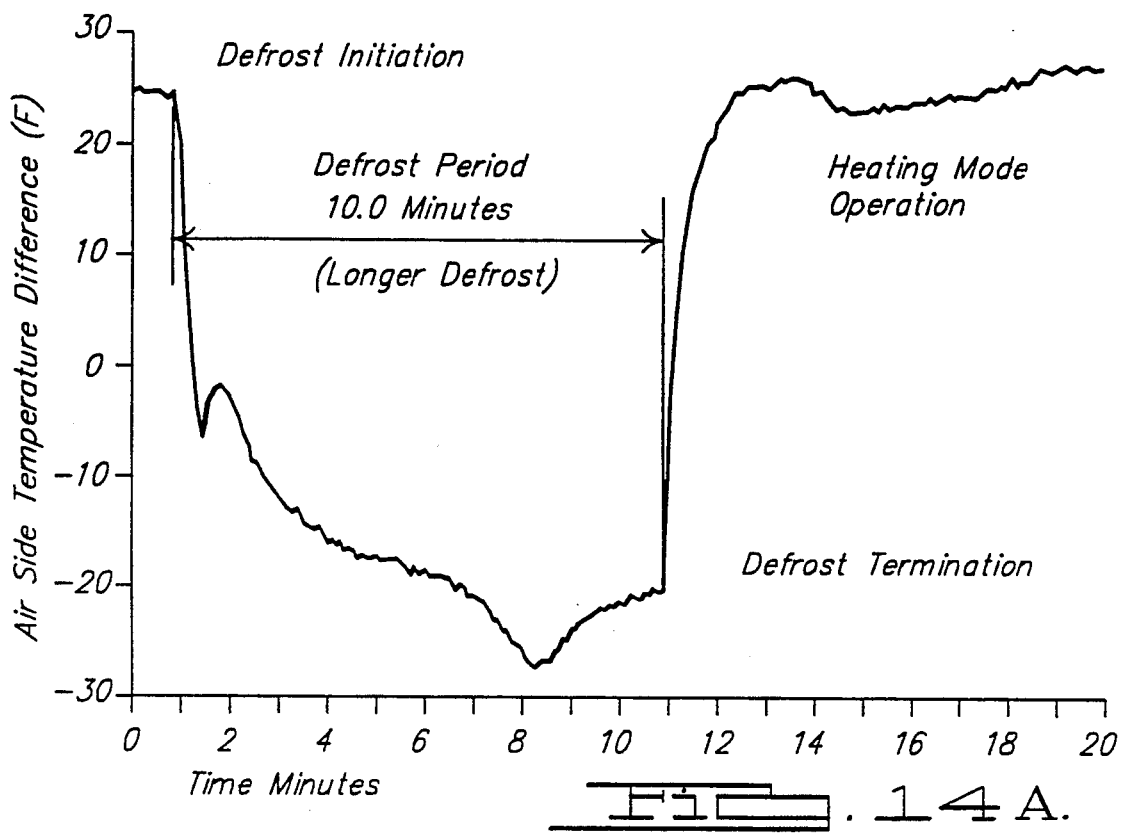
FIG. 14A and 14B (also herein referred collectively to as FIG. 14) is a graph showing indoor coil temperature different over time for two different expansion valve control strategies.
Figure 14B:
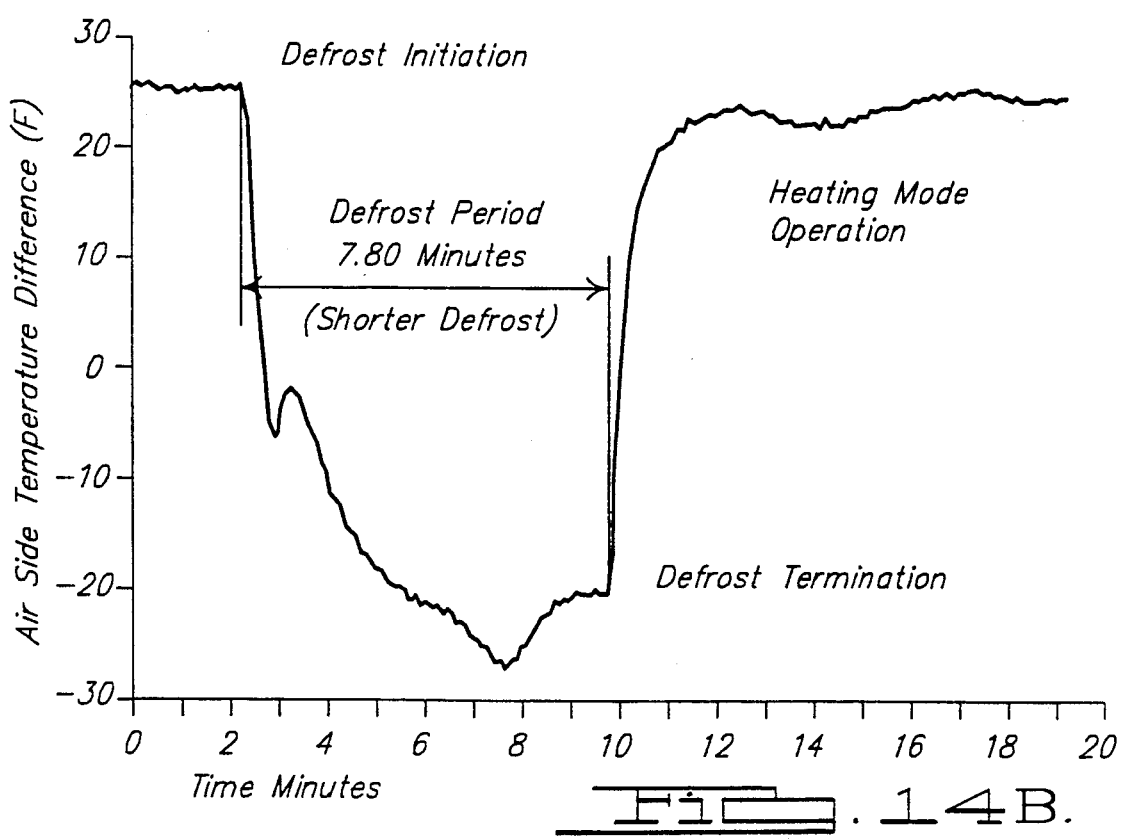

If, on the other hand, the criteria of steps 102, 106 and 108 are satisfied, the size of the current EXV 42 orifice, "Y", is recorded in memory for later use (step 110) and the defrost cycle of step 112 is initiated. To begin this defrost cycle, the four-way valve 40 is reversed and the outdoor fan 34 is shut off. Also, however, the EXV 42 is modulated by the control system to open the valve orifice to a maximum sized opening, that opening preferably being larger than the opening typically used in the cooling mode. By controlling this EXV opening such that it is larger than that typically used for normal cooling mode operations, rapid transfer of the refrigerant charge to the outdoor coil is achieved o the initiation of defrost. This significantly improves the efficiency of the defrost cycle—a function not readily accomplished with conventional flow control devices. By oversizing this EXV opening, the defrost cycle time has been shown to decrease. The decrease in defrost cycle time can be seen by comparing FIGS. 14A and 14B, noting the shorter defrost period in FIG. 14B. Because the larger opening allows higher refrigerant flow, the frost is melted faster and the drain time is shorter, thus significantly improving system performance.

This defrost cycle or mode is continued until either a maximum amount of time has expired (such as 12 minutes), or until the outdoor coil 32 has reached a sufficiently high temperature to warrant defrost cycle termination (steps 114 and 116), preferably about 65° F. The elapsed time is preferably kept by an internal clock in one of the microprocessors and the temperature is provided by sensor 55.

Prior to terminating the defrost cycle in step 122, however, steps 118 and 120 are performed. As soon as the control senses that the outdoor coil temperature has reached the preset built in defrost termination temperature, it turns on the outdoor fan in order to reduce pressure transients. Upon termination of a defrost cycle in a conventionally controlled system, the high pressure refrigerant in the outdoor heat exchanger is exposed to the low pressure suction line of the compressor and the low-pressure refrigerant line in the indoor heat exchanger is exposed to the high pressure discharge line of the compressor. A sudden rise and fall of pressure is experienced in the compressor discharge line. Such pressure transients subject the compressor and the refrigerant lines to mechanical shock which are detrimental to the reliability and longevity of the heat pump.

Figure 9:
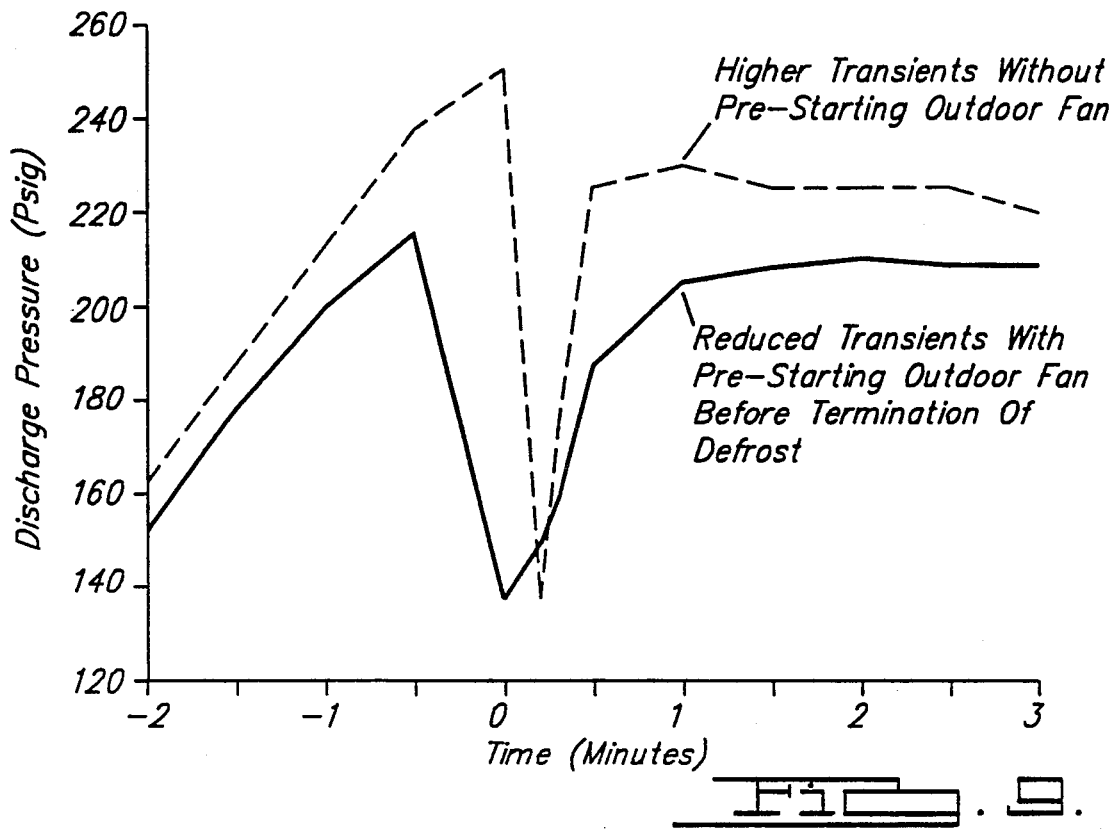
FIG. 9 is a graph depicting the performance improvement gained by pre-starting the outdoor fan prior to the termination of the defrost cycle.

By starting the outdoor fan prior to the termination of the defrost cycle, the present control system allows the outdoor coil to be cooled and pressure transients to be reduced at defrost termination. The outdoor fan is turned on a predetermined amount of time prior to defrost termination, preferably for about twenty seconds. This substantially reduces pressure transients in the heating mode cycle. As shown by the graph of FIG. 9 wherein discharge pressure is plotted versus time, prestarting the outdoor fan prior to the termination of defrost reduces pressure transients in the system considerably.

Figure 10:
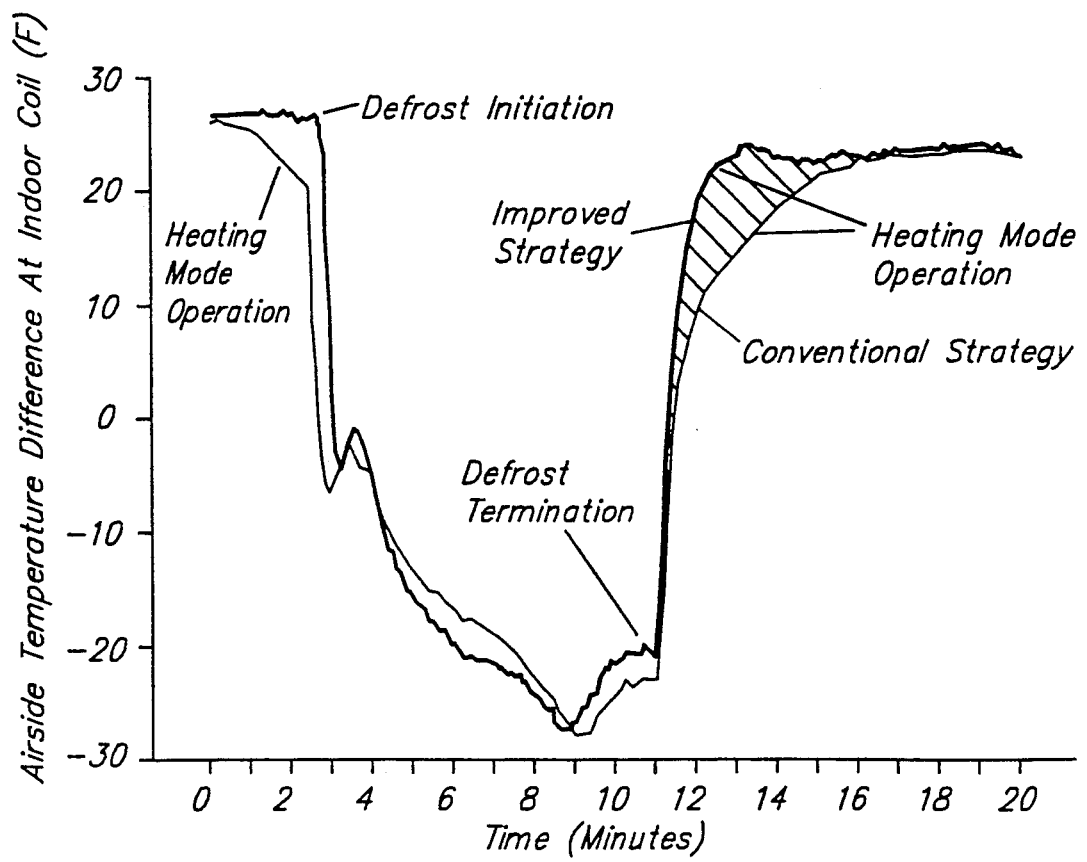
FIG. 10 is a graph illustrating the performance improvement gained by employing the expansion valve control strategy.

Once the outdoor fan has been on for the predetermined amount of time, the defrost cycle is terminated in accordance with step 122. The four way valve is reversed and refrigerant gas again flows from the compressor to the condenser (indoor coil) to resume the heating operation. The EXV 42, however, is left at its wide open position. This speeds the flow of refrigerant gas through the system in order to enhance the recovery of heating capacity. See FIG. 10 which shows in the shaded region the benefit gained by the improved strategy following termination of defrost.

This continues until a predetermined time amount has been exceeded (step 124) wherein in step 126 the EXV opening is reduced. The EXV opening is reduced to an amount equal to $Y + \Delta Y$. This continues for a predetermined amount of time in accordance with step 128 and then the compressor discharge temperature control routine of step 104 is performed wherein the control of the EXV 42 opening is based on the temperature of the compressor discharge.

In addition to initiating the defrost cycle only upon demand as described in the process above, the control system of the present invention enables the time between defrost cycles to be optimized. As previously explained, frost builds on the outdoor coil surfaces whenever the outdoor coil temperature is below 32° F. This reduces the heating capacity of the heat pump requiring a defrost for clearing the frost from the outdoor coil. The frost buildup can be reduced by detecting its accumulation rate thereby allowing the heat pump to operate for a longer period before a defrost is needed.

Figure 11A:
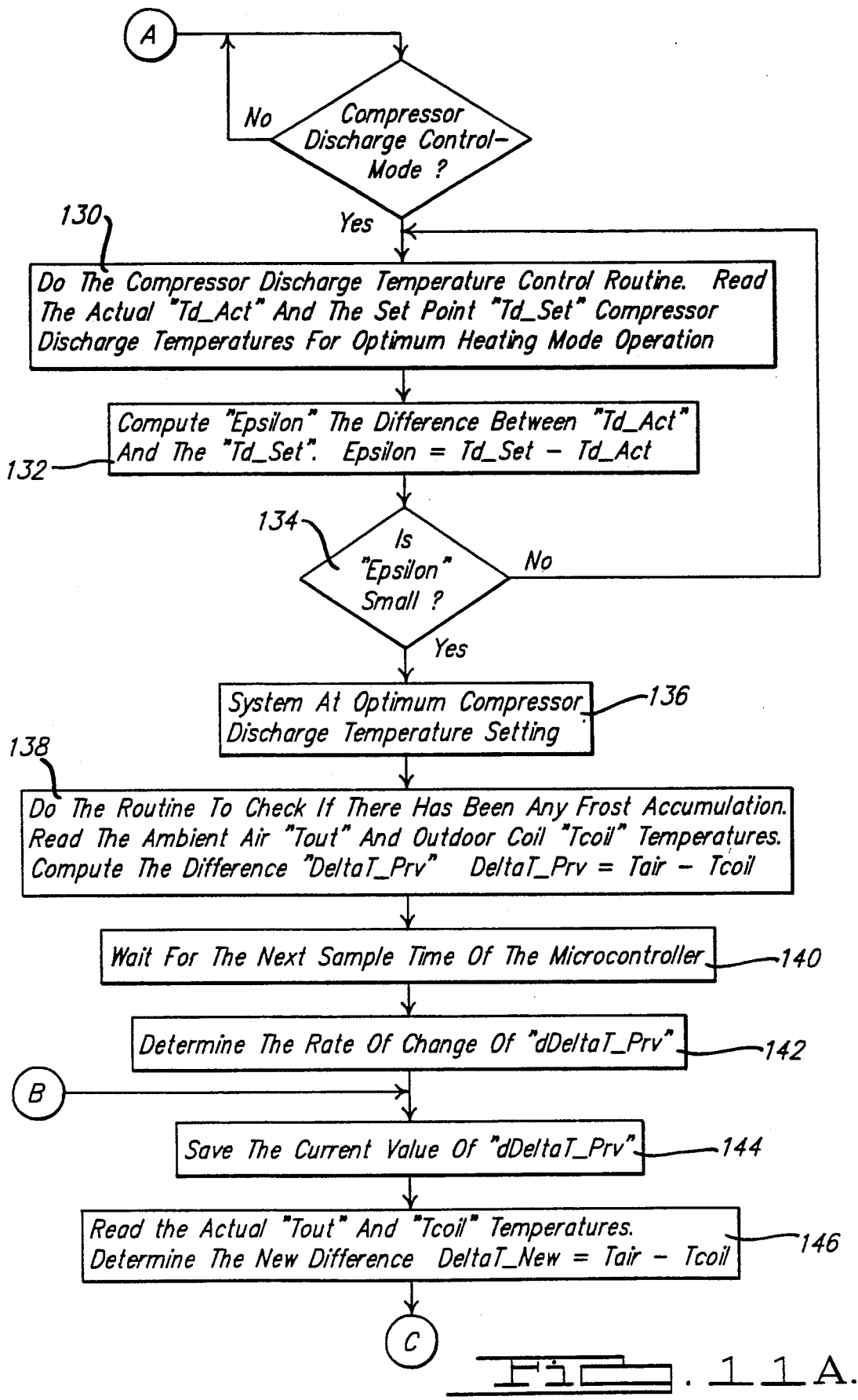
FIGS. 11A and 11B (also herein referred collectively to as FIG. 11) is a flowchart illustrating the control strategy employed by the present invention to monitor and reduce frost buildup on the outdoor coil.
Figure 11B:
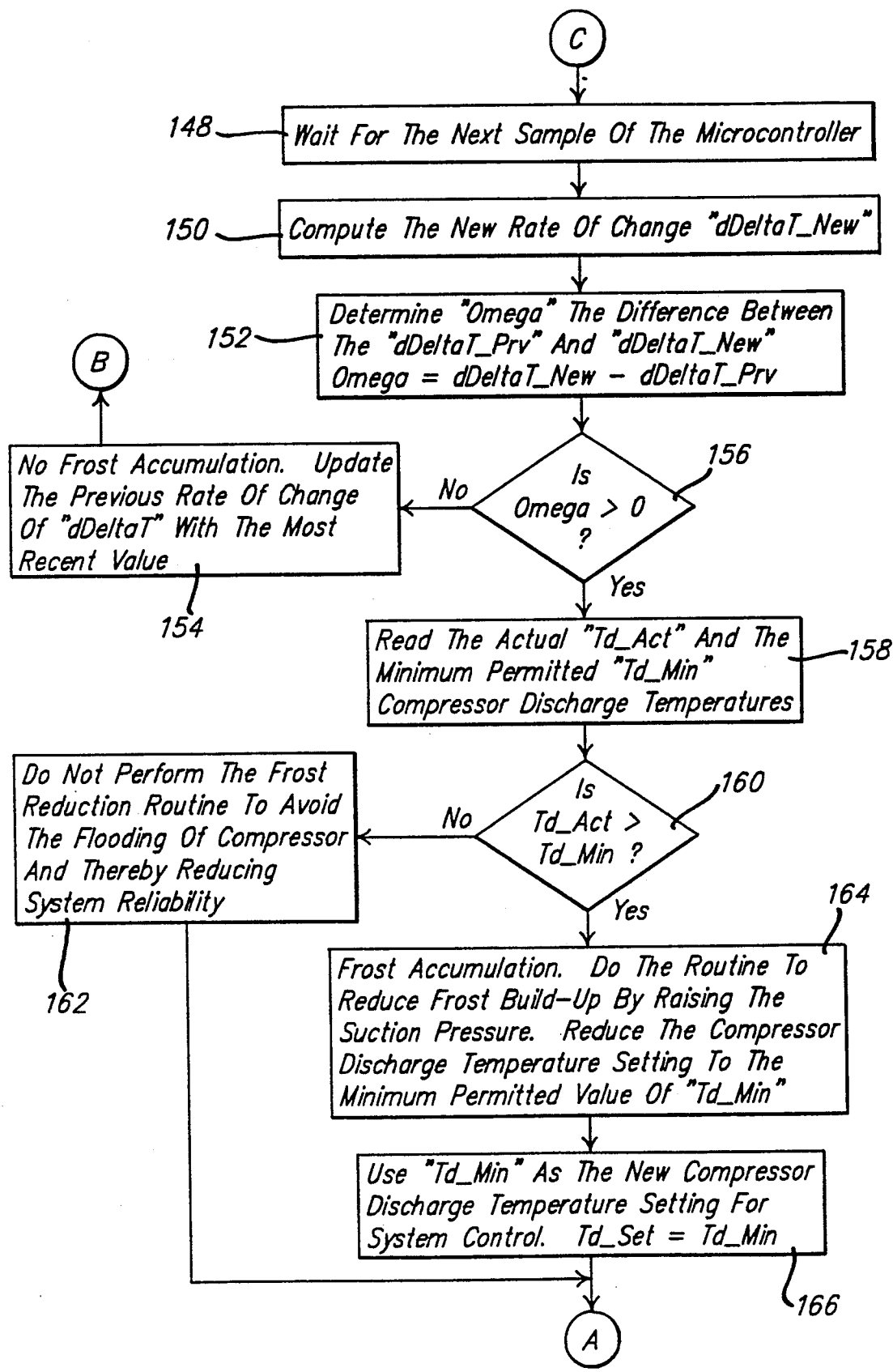
Figure 12:
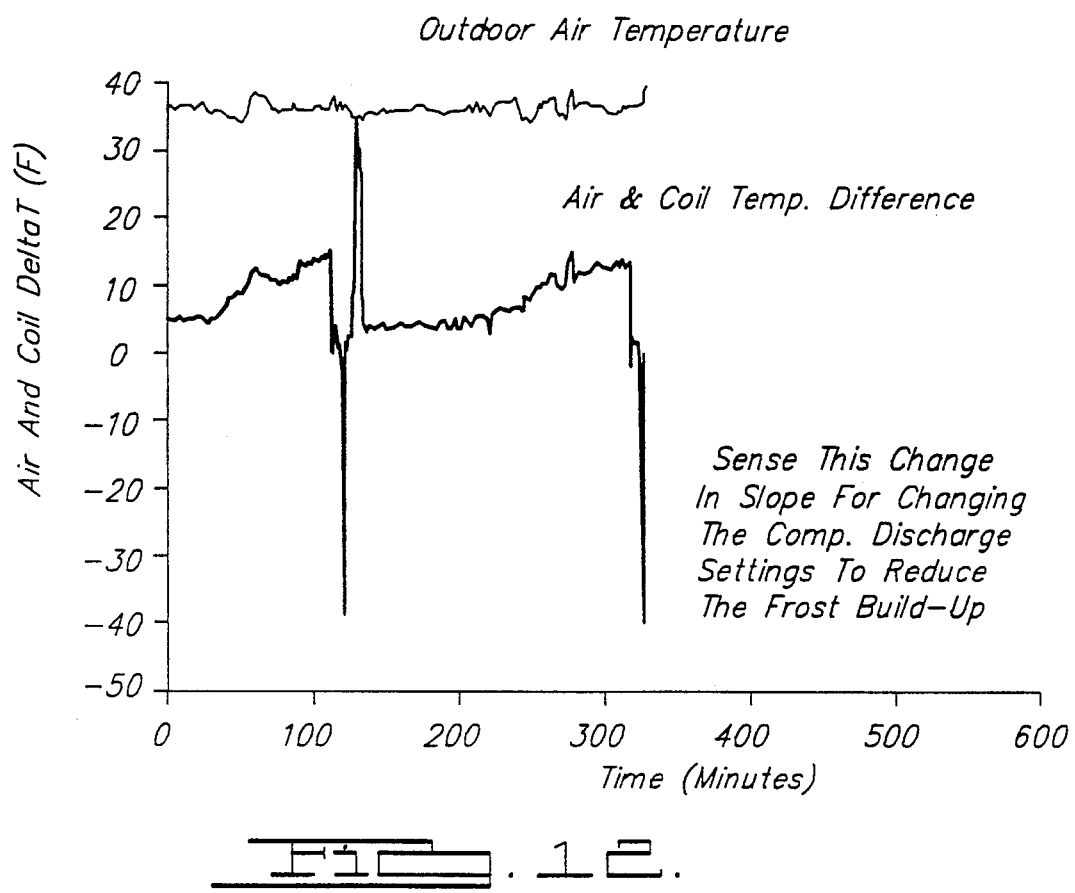
FIG. 12 is a graph depicting air and outdoor coil temperature difference as a function of time.

This may be accomplished by monitoring the temperature difference $\Delta t$ between the outdoor air and outdoor coil. Accumulation of frost on the outdoor coil increases $\Delta t$ (refer to FIG. 12). The controller monitors the change in slope of the $\Delta t$ (refer to FIG. 12) and responds by raising the refrigerant flow by modulating the EXV, if it senses a change in the slope, thereby raising the outdoor coil temperature and making the outdoor coil conditions less favorable to a frost buildup. The control logic for reducing the frost accumulation is shown in FIG. 11. This strategy is not followed when it would cause excessive compressor flood back which could damage the compressor. Therefore the presently preferred embodiment is configured so compressor discharge is not allowed to fall below a preset level (e.g., 150° F.).

As shown in FIG. 11, steps 130-136 ensure optimum heating mode operation based upon the compressor discharge temperature. Once the system is operating in an optimum heating mode, steps 138-150 are performed wherein the difference between the outdoor ambient air temperature and the outdoor coil temperature is calculated and monitored. If the rate of accumulation is increasing, as determined by steps 152-156, the frost reduction routine is performed unless the discharge temperature of the compressor is such that flooding of the compressor and reducing system reliability would result (steps 160-162). In performing this frost reduction routine, EXV 42 is modulated so as to raise the refrigerant flow through the system and making the outdoor coil conditions less favorable to a frost buildup. Upon doing so, the system is returned to a control mode based on the temperature of the compressor discharge.

From the foregoing, it will be seen that the present invention represents a significant departure from conventional defrost cycle control techniques which allows the system to be operated at higher efficiency than previously achieved. The time intervals between inefficient defrost operations are maximized and defrost is performed more quickly.

While the invention has been described with respect to a presently preferred heat pump embodiment, it will of course be understood that the invention can be applied to numerous forms of air heating and heat pump systems. Accordingly, the principles of the invention are not limited to the embodiment described. The invention is capable of certain modification and change without departing from the spirit of the invention as set forth in the appended claims.

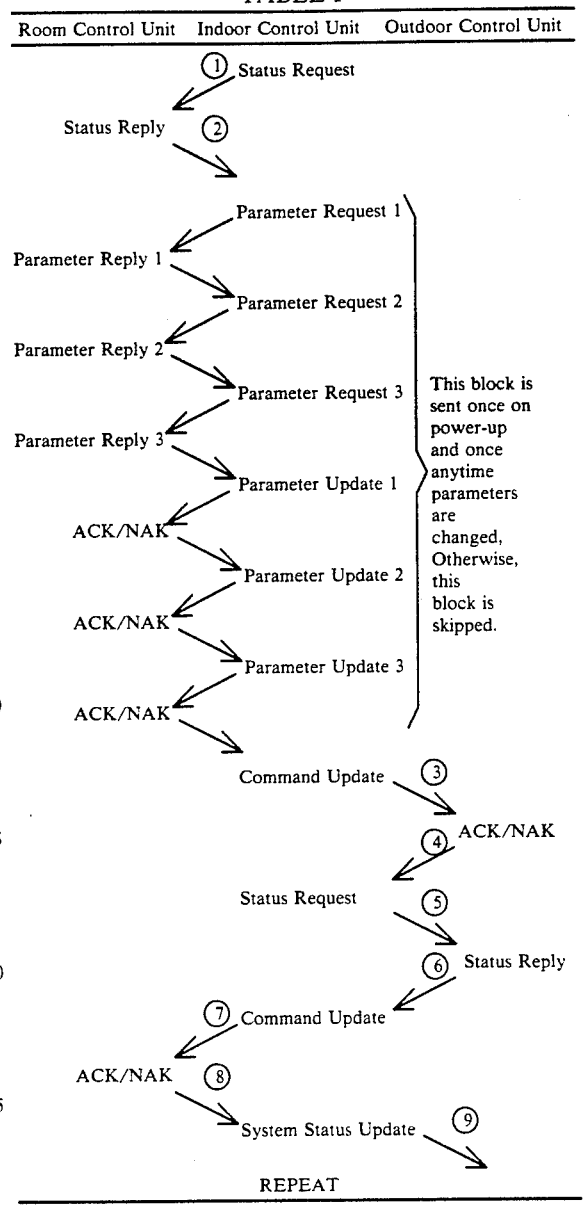

TABLE I

TABLE II

Enhanced Single Speed Message Format For Versions COPE1-27 And Above

| KEY | | | | | | | | | | | | |
|---|---|---|---|---|---|---|---|---|---|---|---|---|
| | | HUM SETPT | HUM % | INV SPD HR | OUTFAN MIN | TEMP WHOLE | TEMP FRACT | SETPT | STPHT NXTPRG TIME | EEV POS NXTPRG STPT | BLWR SPD BLWR SPD | DIAG MODE | FLAG | |
| From Indoor To Indoor | ① 21 | 66 | 80 | 13 | 5 | 76 | 176 | 76 | 64 | 70 | 0 | 0 | 98 | 47 MANUAL MODE NORMAL MODE |
| From Indoor to Outdoor | ② 92 | 131 | 0 | 0 CONFG | 0 MODE | 0 FAN SPD | 0 | 0 | 0 | 0 | 0 | 0 | 0 | |
| From Outdoor to Indoor | ③ 197 | 6 | 203 | (Acknowledge; Above Message Received Okay) | | | | | | | | | | |
| From Indoor To Outdoor | ④ 92 | 195 | 31 | | | | | | | | | | | 128 BIT 7 MNULMODE = 1/NORM = 0<br>64  6 PWR UP = 0/KEYPRES = 1<br>32  5 CMFT = 1/ECON = 0<br>16  4 PARAMETER SETUP = 1<br>8  3 BLOWER ON = 1<br>4  2 LOCKOUT OVRIDE = 1<br>10011 MODE<br>2  00101 MODE<br>1  OFF    EVER<br>    COOL HEAT |
| From Outdoor To Indoor | ⑤ 197 | 67 | 0 | 0 MODE | 0 INV FRQ | 0 MALF | 0 SUCT TEMP | 115 DSCH TEMP +55 | 149 OTDR AMB -77 | 142 OTDR COIL 1-77 | 0 OTDR COIL 2 | 0 CRNT | 0 OTDR % HUM | 158 |
| From Indoor To Thermostat | ⑥ 130 | 0 SETPT OVRIDE | 0 | 0 | 0 INV FRQ | 0 FLAG | 0 DIAG | | | | 0 COMP SPD | 149 OTDR AMB | 0 OTDR % HUM | 104 |
| From Indoor To Outdoor | ⑦ 81 | | | | | 64 BIT 6 MALFUNCTION<br>32  5 MODE ECHO<br>16  4 MODE ECHO<br>4  2 AUX HT<br>2  1 DEFROST<br>1  0 LOCKOUT | | | | | | | | |
| From Thermostat To Indoor | ⑧ 21 | 6 | 27 | 0 | 0 | 0 EEV POS | 0 BLWR SPD | 0 STRP HT | 15 PWM OFF TIME | 5 PWM ON TIME | 0 | 0 | 0 | |
| From Indoor | ⑨ 80 | 129 | 0 | 0 | 0 | | | 53 OUT PID | | | | 255 PID DER FLAG TERM | 25 | 18 BIT 3 DIAGNOSTICS<br>4  2 DEFROST<br>2  1 RU COMM ERROR<br>1  0 CD COMM ERROR |

| Abbreviation | Description |
|---|---|
| HUM SET PT | Humidity Set Point |
| HUM % | Measured Indoor Relative Humidity (times 2) |
| INV SPD | Inverter Speed (0=off; 200=on) |
| OUT FAN | Outdoor Fan Speed (0=off; 100=low; 200=high) |
| STP HT | Number of Levels of Resistance Heat On |
| EEV POS | Electronic Expansion Valve Open Position |
| BLWR SPD | Indoor Blower Speed |
| CHECK SUM | Sum (modulo 256) of Numbers in Message |
| HR | Hour of Day |
| MIN | Minute of Day |
| TEMP WHOLE | Measured Room Temperature Whole Number |
| TEMP FRACT | Measured Room Temperature Fractional Part |
| SET PT | Thermostat Set Point |
| NXT PRG TIME | Next Programmed Set Point Change Time |
| NXT PRG ST PT | Next Programmed Set Point |
| BLWR SPD | Indoor Blower Speed in Fan ON Mode |
| DIAG MODE | Diagnostic Mode Number |
| MNUL MODE | Manual Mode |
| NORM | Normal Running Mode |
| PWR UP | Power Up |
| KEY PRES | Key Pressed |
| CMFT | Comfort Mode |
| ECON | Economy Mode |
| PARAMETER SETUP | Parameter Setup Mode |
| BLOWER ON | Blower in Fan ON Mode |
| LOCKOUT OVRIDE | Compressor Lockout Time Override |
| MODE | Off Cool Heat or Emer Operating Mode |
| CONFIG | Outdoor Configuration |
| MODE | Operating Mode of Outdoor Unit |
| INV FRQ | Inverter Frequency (Compressor ON or OFF) |
| MALF | Outdoor Malfunction Codes |
| SUCT TEMP | Suction Temperature |
| DSCH TEMP | Discharge Temperature |
| OTDR AMB | Outdoor Ambient Temperature |
| OTDR COIL1 | Outdoor Coil Temperature #1 |
| OTDR COIL2 | Outdoor Coil Temperature #2 |
| CRNT | Compressor Current |
| OTDR % HUM | Outdoor Percent Relative Humidity |
| ST PT OVRIDE | Set Point Override |
| DIAG | Diagnostic Mode Number |
| COMP SPD | Compressor Speed (ON/OFF) |
| OTDR AMB | Outdoor Ambient Temperature |
| OTDR % HUM | Outdoor Percent Relative Humidity |
| MALFUNCTION | System Operating Under a Malfunction |
| MODE ECHO | System Mode (Heat, etc.) Echoed to Thermostat |
| AUX HT | Resistance Strip Heat ON/OFF |
| DEFROST | Running Defrost Routine |
| LOCKOUT | Compressor in Lockout Time |
| EEV POS | Electronic Expansion Valve Open Position |
| BLWR SPD | Indoor Blower Speed |
| STRP HT | Number of Strip Heat Levels ON |
| OUT PID | PID Control Value |
| PWM OFF TIME | Minutes Strip Heat or Compressor OFF in Cycle |
| PWM ON TIME | Minutes Strip Heat or Compressor ON in Cycle |
| PID DER TERM | Value of Derivative Term of PID Value |
| DIAGNOSTICS | System in Diagnostics Mode |
| DEFROST | System in Defrost Mode |
| RU COMM ERROR | Communication Fault Between Indoor & Thermostat |
| OD COMM ERROR | Communication Fault Between Indoor & Outdoor |

Note:
In message 2 the top set of abbreviations describe the numbers shown when the system is in manual mode. The lower set of abbreviations describe the numbers in normal running mode.

What is claimed is:

1. A control system for controlling the accumulation of frost on the outdoor coil of a heat pumping system, comprising:

first sensor means thermally decoupled from said heat pumping system for measuring a first parameter indicative of the temperature of the outdoor ambient air;

second sensor means thermally coupled to said heat pumping system for measuring a second parameter indicative of the temperature of said outdoor coil;

processor means electrically coupled to said first and second sensor means for controlling the initiation of a defrost cycle wherein hot gas is pumped through said outdoor coil to melt said frost when the difference between said first and second parameters exceeds a predefined amount; and wherein said heat pump system includes an electrically controllable expansion valve for metering the flow of refrigerant into said evaporator coil and said control system further comprises means for continually monitoring said difference between said first and second parameters, said processor means being electrically coupled to said monitoring means and said expansion valve for controlling said valve in response to a change in said monitored difference.

2. The control system of claim 1 wherein said predefined amount is based on outdoor air temperature.

3. The control system of claim 1 wherein said processor means controls initiation of said defrost cycle based at least in part upon testing whether said outdoor coil temperature falls below a permitted level.

4. The control system of claim 3 wherein said permitted level is 32° F.

5. The control system of claim 1 wherein said valve is controlled based upon the rate of change in said monitored difference.

6. The control system of claim 1 wherein said expansion valve is controlled to open to an orifice size larger than that used in a normal cooling mode of the heat pump system when the defrost cycle is initiated.

7. The control system of claim 1 wherein said processor means is further electrically coupled to a fan for delivering air across said outdoor coil, said fan being turned off upon the initiation of said defrost cycle and controlled so as to be turned back on prior to terminating said defrost cycle.

8. A method of operating a heat pump system to control frost that accumulates on the outdoor evaporator coil during normal heat mode operations comprising the steps of:

determining a maximum allowable amount of frost accumulation;

measuring a first parameter indicative of a current amount of frost accumulation;

using said first parameter to control the rate of refrigerant flow through the outdoor evaporator coil to raise the coil temperature and decrease frost accumulation;

further decreasing frost accumulation by initiating a defrost cycle wherein hot gas is pumped into said evaporator coil to melt said frost when said current amount of frost is substantially equal to said maximum allowable amount;

terminating said defrost cycle; and returning said heat pump system to the normal heat mode operations.

9. The method of claim 8 further comprising the steps of sensing the outdoor ambient air temperature and sensing the temperature of the outdoor evaporator coil.

10. The method of claim 9 wherein said maximum allowable amount of frost accumulation is determined as a function of the outdoor ambient air temperature and the outdoor evaporator coil temperature.

11. The method of claim 10 wherein said maximum allowable amount of frost accumulation is determined as a function of the difference between the outdoor ambient air temperature and the temperature of the outdoor coil.

12. The method of claim 9 wherein said current amount of frost accumulation is determined as a function of the outdoor ambient air temperature and the outdoor evaporator coil temperature.

13. The method of claim 9 wherein said current amount of frost accumulation is determined as a function of the difference between the outdoor ambient air temperature and the outdoor evaporator coil temperature.

14. The method of claim 11 wherein the defrost cycle is initiated when said difference between said outdoor ambient air temperature and said outdoor coil temperature exceed a predefined amount and said temperature of said outdoor evaporator coil falls below a predetermined level.

15. The method of claim 14 wherein said predetermined evaporator coil temperature level is about 32° F.

16. The method of claim 14 wherein said predetermined difference between said outdoor ambient air and evaporator coil temperature is based on outdoor air temperature.

17. The method of claim 8 wherein said defrost cycle is initiated only when a predetermined amount of time has elapsed since the previous defrost cycle.

18. The method of claim 8 further comprising the step of determining a defrost cycle termination temperature of the outdoor evaporator coil.

19. The method of claim 18 wherein said defrost termination temperature is about 65° F.

20. The method of claim 8 wherein said heat pumping system includes a fan for delivering air across said outdoor coil and said method further comprises the step of turning on the outdoor fan prior to terminating said defrost cycle and returning to the normal heat mode.

21. A method of operating a heat pump system to control frost that accumulates on the outdoor evaporator coil during normal heat mode operations comprising the steps of:
detecting the rate of accumulation of frost on said coil;
monitoring the rate of increase of said accumulation;
causing an increased rate of refrigerant flow through the outdoor coil to raise the coil temperature and decrease frost accumulation.

22. The method of claim 21 wherein said accumulation rate is detected by monitoring the temperature difference between the outdoor air and the outdoor evaporator coil.

23. The method of claim 21 wherein said heat pump is of the type having an expansion valve and said refrigerant flow is increased by modulating said expansion valve.

24. The method of claim 23 wherein said expansion valve is modulated to create a opening larger than that used in the normal cooling mode of the system.

25. An air-conditioning system having improved defrost performance, comprising:
a heat pumping fluid circuit having an outdoor heat exchanger, an indoor heat exchanger and a compressor;
an electrically adjustable expansion valve disposed in said heat pumping fluid circuit;
first sensor means for sensing a value indicative of outdoor air temperature;
second sensor means for sensing a value indicative of outdoor heat exchanger temperature; and
a processor system coupled to said first and second sensor means and to said expansion valve for adjusting the setting of said expansion valve;
said processor system including frost control strategy determining means including means for modulating the setting of said expansion valve based on difference between outdoor air temperature and outdoor heat exchanger temperature.

26. The air-conditioning system of claim 25 wherein said frost control strategy determining means modulates the setting of said expansion valve based on the time rate of change in the difference between outdoor air temperature and outdoor heat exchanger temperature.

27. The air-conditioning system of claim 25 wherein said frost control strategy determining means modulates the setting of said expansion valve to increase flow through said expansion valve in response to accumulation of frost on said outdoor heat exchanger, thereby raising the outdoor heat exchanger temperature making conditions less favorable to frost buildup.

28. An air-conditioning system having improved defrost performance, comprising;
a heat pump fluid circuit having an outdoor heat exchanger, an indoor heat exchanger and a compressor;
an electrically adjustable expansion valve disposed in said heat pumping fluid circuit;
means for sensing the rate of frost buildup on the outdoor heat exchanger; and
a processor system coupled to said sensing means and to said expansion valve for adjusting the setting of said expansion valve;
said processor system including frost control strategy determining means including means for modulating the setting of said expansion valve to increase flow through said heat pumping fluid circuit in response to the rate of frost buildup.

29. An air-conditioning system having improved defrost performance, comprising:
a heat pumping fluid circuit having an outdoor heat exchanger, an indoor heat exchanger and a compressor operable to provide a normal heat exchange cycle and a defrost cycle in which flow through the fluid circuit is reversed to melt accumulated frost;
an electrically adjustable expansion valve disposed in said heat pumping fluid circuit;
processor system coupled to said expansion valve for adjusting the setting of said expansion valve;
said processor system including defrost strategy determining means (a) for causing said expansion valve to substantially fully open during at least a portion of said defrost cycle and (b) for computing a rapid recovery expansion valve setting used at termination of said defrost cycle,
said rapid recovery expansion valve setting being computed to cause said heat pumping fluid circuit to reach steady state operation at a rate more rapid than the rate achieved using the valve setting used during the normal heat exchange cycle.

30. A control system for controlling the accumulation of frost on the outdoor coil of a heat pumping system, comprising:

first sensor means thermally decoupled from said heat pumping system for measuring a first parameter indicative of the temperature of the outdoor ambient air;

second sensor means thermally coupled to said heat pumping system for measuring a second parameter indicative of the temperature of said outdoor coil;

processor means electrically coupled to said first and second sensor means for controlling the initiation of a defrost cycle wherein hot gas is pumped through said outdoor coil to melt said frost when the difference between said first and second parameters exceeds a predefined amount; and wherein said heat pump system includes an electrically controllable expansion valve for metering the flow of refrigerant into said evaporator coil and said control system further comprises means for monitoring said difference between said first and second parameters, said processor means being electrically coupled to said monitoring means and said expansion valve for controlling said valve in response to a change in said monitored difference.

31. The control system of claim 30 wherein said predefined amount is based on outdoor air temperature.

32. The control system of claim 30 wherein said processor means controls initiation of said defrost cycle based at least in part upon testing whether said outdoor coil temperature falls below a permitted level.

33. The control system of claim 32 wherein said permitted level is 32° F.

34. The control system of claim 30 wherein said valve is controlled based upon the rate of change in said monitored difference.

35. The control system of claim 30 wherein said expansion valve is controlled to open to an orifice size larger than that used in a normal cooling mode of the heat pump system when the defrost cycle is initiated.

36. The control system of claim 30 wherein said processor means is further electrically coupled to a fan for delivering air across said outdoor coil, said fan being turned off upon the initiation of said defrost cycle and controlled so as to be turned back on prior to terminating said defrost cycle.

* * * * *

UNITED STATES PATENT AND TRADEMARK OFFICE
CERTIFICATE OF CORRECTION

PATENT NO. : 5,319,943
DATED : June 14, 1994
INVENTOR(S) : Vijay Bahel; Hank Millet; Mickey Hickey; Hung Pham; Gregory P. Herroon It is certified that error appears in the above-indentified patent and that said Letters Patent is hereby corrected as shown below:

Column 2, line 33, "ar" should be -- are --.

Column 3, line 3, after "the" insert -- presently --.

Column 3, line 5, "FIG." should be -- FIGS. --.

Column 3, line 40, "hear" should be -- near --.

Column 7, line 28, "bloc" should be -- block --.

Column 8, line 29, "and" should be -- an --.

Column 8, line 46, after "16" insert -- . --.

Column 9, line 60, "o" should be -- on --.

Column 13, in TABLE II, between lines 4 and 5, insert the following:

-- From indoor     81      194     19
   To Thermostat --.

Column 13, line 6, "from Indoor" should be -- From Thermostat --.

Column 13, line 10, "0" (thirteenth occurrence) should be -- 223 --.

Column 14, last line in box, "CD" should be -- OD --.

UNITED STATES PATENT AND TRADEMARK OFFICE
CERTIFICATE OF CORRECTION

PATENT NO. : 5,319,943

DATED : June 14, 1994

INVENTOR(S) : Vijay Bahel; Hank Millet; Mickey Hickey; Hung Pham; Gregory P. Herroon It is certified that error appears in the above-identified patent and that said Letters Patent is hereby corrected as shown below:

Column 15, before line 1, insert -- TABLE III --.

Column 17, line 67, "a" should be -- an --.

Signed and Sealed this

Fourteenth Day of February, 1995

Attest:

BRUCE LEHMAN

Attesting Officer     Commissioner of Patents and Trademarks